United States Patent
Su et al.

(10) Patent No.: US 11,145,118 B2
(45) Date of Patent: Oct. 12, 2021

(54) EXTRACTION OF BODY DIMENSIONS FROM PLANAR GARMENT PHOTOGRAPHS OF FITTING GARMENTS

(71) Applicant: eBay Inc., San Jose, CA (US)

(72) Inventors: Jonathan Su, San Jose, CA (US); Mihir Naware, Redwood City, CA (US); Jatin Chhugani, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/523,069

(22) Filed: Jul. 26, 2019

(65) Prior Publication Data

US 2020/0090402 A1 Mar. 19, 2020

Related U.S. Application Data

(63) Continuation of application No. 16/054,139, filed on Aug. 3, 2018, now Pat. No. 10,410,414, which is a
(Continued)

(51) Int. Cl.
  *G06T 17/20* (2006.01)
  *G06T 19/20* (2011.01)
  (Continued)

(52) U.S. Cl.
  CPC .............. *G06T 17/20* (2013.01); *A41H 1/00* (2013.01); *G06F 30/20* (2020.01); *G06K 9/6262* (2013.01);
  (Continued)

(58) Field of Classification Search
  None
  See application file for complete search history.

(56) References Cited

U.S. PATENT DOCUMENTS 3,823,308 A 7/1974 Goldberg
3,852,571 A 12/1974 Hall et al.
(Continued)

FOREIGN PATENT DOCUMENTS

AU 199928111 B2 4/2003
AU 200197079 B2 8/2007
(Continued)

OTHER PUBLICATIONS

"Black et al. DRAPE: Dressing Any Person" (Year: 2012).*
(Continued)

*Primary Examiner* — Hilina K Demeter
(74) *Attorney, Agent, or Firm* — Schwegman Lundberg & Woessner, P.A.

(57) ABSTRACT

Techniques for extraction of body parameters, dimensions and shape of a customer are presented herein. A model descriptive of a garment, a corresponding calibration factor and reference garment shapes can be assessed. A garment shape corresponding to the three-dimensional model can be selected from the reference garment shapes based on a comparison of the three-dimensional model with the reference garment shapes. A reference feature from the plurality of reference features may be associated with the model feature. A measurement of the reference feature may be calculated based on the association and the calibration factor. The computed measurement can be stored in a body profile associated with a user. An avatar can be generated for the user based on the body profile and be used to show or indicate fit of a garment, as well as make fit and size recommendations.

20 Claims, 15 Drawing Sheets

Related U.S. Application Data continuation of application No. 14/474,003, filed on Aug. 29, 2014, now Pat. No. 10,068,371.

(60) Provisional application No. 61/905,126, filed on Nov. 15, 2013, provisional application No. 61/904,263, filed on Nov. 14, 2013, provisional application No. 61/904,522, filed on Nov. 15, 2013, provisional application No. 61/905,118, filed on Nov. 15, 2013, provisional application No. 61/905,122, filed on Nov. 15, 2013.

(51) Int. Cl.

| | | |
|---|---|---|
| *G06Q 30/06* | (2012.01) | |
| *G06T 15/00* | (2011.01) | |
| *G06F 30/20* | (2020.01) | |
| *G06T 17/00* | (2006.01) | |
| *G06T 19/00* | (2011.01) | |
| *G06K 9/62* | (2006.01) | |
| *G06T 17/10* | (2006.01) | |
| *A41H 1/00* | (2006.01) | |
| *A41H 3/00* | (2006.01) | |
| *G06F 111/02* | (2020.01) | |
| *G06F 113/12* | (2020.01) | |

(52) U.S. Cl.
CPC ....... *G06Q 30/0643* (2013.01); *G06T 15/005* (2013.01); *G06T 17/00* (2013.01); *G06T 17/10* (2013.01); *G06T 19/00* (2013.01); *G06T 19/20* (2013.01); *A41H 3/007* (2013.01); *G06F 2111/02* (2020.01); *G06F 2113/12* (2020.01); *G06T 2210/16* (2013.01); *G06T 2215/16* (2013.01)

(56) References Cited

U.S. PATENT DOCUMENTS

| | | | |
|---|---|---|---|
| 3,896,266 | A | 7/1975 | Waterbury |
| 4,471,216 | A | 9/1984 | Herve |
| 5,053,606 | A | 10/1991 | Kimizu |
| 5,255,352 | A | 10/1993 | Falk |
| 5,416,306 | A | 5/1995 | Imahata |
| 5,495,568 | A | 2/1996 | Beavin |
| 5,532,464 | A | 7/1996 | Josephson et al. |
| 5,679,938 | A | 10/1997 | Templeton et al. |
| 5,708,422 | A | 1/1998 | Blonder et al. |
| 5,718,178 | A | 2/1998 | Smith |
| 5,750,972 | A | 5/1998 | Botvin |
| 5,770,843 | A | 6/1998 | Rose et al. |
| 5,793,028 | A | 8/1998 | Wagener et al. |
| 5,817,482 | A | 10/1998 | Bandman et al. |
| 5,870,456 | A | 2/1999 | Rogers |
| 5,883,810 | A | 3/1999 | Franklin et al. |
| 5,903,878 | A | 5/1999 | Talati et al. |
| 5,907,801 | A | 5/1999 | Albert et al. |
| 5,907,832 | A | 5/1999 | Pieterse et al. |
| 5,930,769 | A | 7/1999 | Rose |
| 5,963,917 | A | 10/1999 | Ogram |
| 5,987,500 | A | 11/1999 | Arunachalam |
| 6,029,150 | A | 2/2000 | Kravitz |
| 6,052,675 | A | 4/2000 | Checchio |
| 6,175,655 | B1 | 1/2001 | Georg et al. |
| 6,212,556 | B1 | 4/2001 | Arunachalam |
| 6,226,624 | B1 | 5/2001 | Watson et al. |
| 6,266,649 | B1 | 7/2001 | Linden et al. |
| 6,310,627 | B1 | 10/2001 | Sakaguchi |
| 6,415,199 | B1 | 7/2002 | Liebermann |
| 6,490,534 | B1 | 12/2002 | Pfister |
| 6,497,359 | B1 | 12/2002 | Chihara |
| 6,546,309 | B1 | 4/2003 | Gazzuolo |
| 6,643,385 | B1 | 11/2003 | Bravomalo |
| 6,813,838 | B2 | 11/2004 | McCormick |
| 6,836,765 | B1 | 12/2004 | Sussman |
| 7,242,999 | B2 | 7/2007 | Wang |
| 7,308,332 | B2 | 12/2007 | Okada et al. |
| 7,328,119 | B1 | 2/2008 | Pryor et al. |
| 7,354,411 | B2 | 4/2008 | Perry et al. |
| 7,398,133 | B2 | 7/2008 | Wannier et al. |
| 7,430,537 | B2 | 9/2008 | Templeton et al. |
| 7,436,976 | B2 | 10/2008 | Levy et al. |
| 7,548,794 | B2 | 6/2009 | Vandergriff et al. |
| 7,574,653 | B2 | 8/2009 | Croney et al. |
| 7,647,041 | B2 | 1/2010 | Gonsalves et al. |
| 7,663,648 | B1 | 2/2010 | Saldanha et al. |
| 7,714,912 | B2 | 5/2010 | Faisman et al. |
| 8,024,260 | B1 | 9/2011 | Hogl et al. |
| 8,032,943 | B2 | 10/2011 | DeMello et al. |
| 8,090,465 | B2 | 1/2012 | Zeng |
| 8,269,778 | B1 | 9/2012 | Baraff et al. |
| 8,359,247 | B2 | 1/2013 | Vock |
| 8,525,828 | B1* | 9/2013 | Bates ................. G06T 15/00 345/419 |
| 8,655,053 | B1 | 2/2014 | Hansen |
| 8,659,596 | B2 | 2/2014 | Corazza et al. |
| 8,704,832 | B2 | 4/2014 | Taylor et al. |
| 8,711,175 | B2 | 4/2014 | Aarabi |
| 8,736,606 | B2 | 5/2014 | Ramalingam |
| 8,749,556 | B2 | 6/2014 | de Aguiar et al. |
| 8,797,328 | B2 | 8/2014 | Corazza et al. |
| 8,855,375 | B2 | 10/2014 | Macciola et al. |
| 8,935,611 | B2 | 1/2015 | Oberbrunner et al. |
| 8,970,585 | B2 | 3/2015 | Weaver |
| 9,098,813 | B1 | 8/2015 | Konig et al. |
| 9,098,873 | B2 | 8/2015 | Geisner et al. |
| 9,176,989 | B2 | 11/2015 | Deng et al. |
| 9,241,184 | B2 | 1/2016 | Weerasinghe |
| 9,378,593 | B2 | 6/2016 | Chhugani et al. |
| 9,420,319 | B1 | 8/2016 | Story, Jr. et al. |
| 9,460,342 | B1 | 10/2016 | Freund et al. |
| 9,465,572 | B2 | 10/2016 | Yamat et al. |
| 9,691,161 | B1 | 6/2017 | Yalniz et al. |
| 9,717,982 | B2 | 8/2017 | Quinn et al. |
| 9,905,019 | B2 | 2/2018 | Applegate et al. |
| 9,923,622 | B2 | 3/2018 | Jactat et al. |
| 9,940,749 | B2 | 4/2018 | Chen et al. |
| 9,953,460 | B2 | 4/2018 | Chhugani et al. |
| 10,068,371 | B2 | 9/2018 | Su et al. |
| 10,089,680 | B2 | 10/2018 | Lin et al. |
| 10,410,414 | B2 | 9/2019 | Su et al. |
| 2001/0023417 | A1 | 9/2001 | Stefik et al. |
| 2001/0026272 | A1 | 10/2001 | Feld et al. |
| 2002/0004763 | A1 | 1/2002 | Lam |
| 2002/0035793 | A1 | 3/2002 | Byrd |
| 2002/0077837 | A1 | 6/2002 | Krueger et al. |
| 2002/0126328 | A1 | 9/2002 | Lehmeier et al. |
| 2002/0174360 | A1 | 11/2002 | Ikeda |
| 2003/0101105 | A1 | 5/2003 | Vock |
| 2003/0139896 | A1 | 7/2003 | Dietz et al. |
| 2003/0152272 | A1 | 8/2003 | Venable |
| 2004/0049309 | A1 | 3/2004 | Gardner et al. |
| 2004/0083142 | A1 | 4/2004 | Kozzinn |
| 2004/0127277 | A1 | 7/2004 | Walker et al. |
| 2005/0289081 | A1 | 12/2005 | Spomy |
| 2006/0020482 | A1 | 1/2006 | Coulter |
| 2006/0059054 | A1 | 3/2006 | Adiseshan |
| 2006/0202986 | A1 | 9/2006 | Okada et al. |
| 2007/0005174 | A1 | 1/2007 | Thomas |
| 2007/0124215 | A1 | 5/2007 | Simmons |
| 2007/0182736 | A1 | 8/2007 | Weaver |
| 2007/0199076 | A1 | 8/2007 | Rensin et al. |
| 2007/0223704 | A1 | 9/2007 | Brickell et al. |
| 2007/0232272 | A1 | 10/2007 | Gonsalves et al. |
| 2007/0250203 | A1 | 10/2007 | Yamamoto et al. |
| 2008/0022086 | A1 | 1/2008 | Ho et al. |
| 2008/0140650 | A1 | 6/2008 | Stackpole |
| 2008/0163344 | A1 | 7/2008 | Yang |
| 2008/0201228 | A1 | 8/2008 | Gillet et al. |
| 2008/0201638 | A1 | 8/2008 | Nair |
| 2008/0221403 | A1 | 9/2008 | Fernandez |
| 2008/0312765 | A1 | 12/2008 | Gardiner et al. |
| 2008/0312998 | A1 | 12/2008 | Templeton et al. |

(56) References Cited

U.S. PATENT DOCUMENTS

| | | |
|---|---|---|
| 2009/0002224 A1 | 1/2009 | Khatib et al. |
| 2009/0018803 A1 | 1/2009 | Ko et al. |
| 2009/0029337 A1 | 1/2009 | Nasci et al. |
| 2009/0115777 A1 | 5/2009 | Reyers Moreno |
| 2009/0144639 A1 | 6/2009 | Nims et al. |
| 2009/0193675 A1 | 8/2009 | Sieber |
| 2009/0222127 A1* | 9/2009 | Lind .................. D04B 37/02 700/132 |
| 2009/0248537 A1 | 10/2009 | Sarkeshik |
| 2009/0276300 A1 | 11/2009 | Shaw et al. |
| 2009/0287452 A1 | 11/2009 | Stanley et al. |
| 2009/0293116 A1 | 11/2009 | Demello et al. |
| 2010/0030578 A1 | 2/2010 | Siddique et al. |
| 2010/0049633 A1 | 2/2010 | Wannier et al. |
| 2010/0076819 A1* | 3/2010 | Wannier ............. G06Q 30/0246 705/7.33 |
| 2010/0082360 A1 | 4/2010 | Chien et al. |
| 2010/0097395 A1 | 4/2010 | Chang et al. |
| 2010/0191770 A1 | 7/2010 | Cho et al. |
| 2010/0280920 A1 | 11/2010 | Scott et al. |
| 2010/0305909 A1 | 12/2010 | Wolper et al. |
| 2010/0306082 A1 | 12/2010 | Wolper et al. |
| 2010/0313141 A1 | 12/2010 | Yu et al. |
| 2010/0332567 A1 | 12/2010 | Samadani |
| 2011/0022372 A1 | 1/2011 | Isogai et al. |
| 2011/0022965 A1 | 1/2011 | Lawrence et al. |
| 2011/0063208 A1 | 3/2011 | Van den eerenbeemd et al. |
| 2011/0099122 A1 | 4/2011 | Bright et al. |
| 2011/0145093 A1 | 6/2011 | Paradise et al. |
| 2011/0184831 A1 | 7/2011 | Dalgleish |
| 2011/0191070 A1 | 8/2011 | Ramalingam |
| 2011/0231278 A1 | 9/2011 | Fries |
| 2011/0292034 A1 | 12/2011 | Corazza et al. |
| 2011/0298897 A1* | 12/2011 | Sareen .................. G06T 19/00 348/47 |
| 2012/0030060 A1 | 2/2012 | Lu et al. |
| 2012/0030062 A1 | 2/2012 | Stauffer et al. |
| 2012/0054059 A1 | 3/2012 | Rele |
| 2012/0078145 A1 | 3/2012 | Malhi et al. |
| 2012/0095589 A1 | 4/2012 | Vapnik |
| 2012/0233003 A1 | 9/2012 | Calman et al. |
| 2012/0259720 A1 | 10/2012 | Nuzzi |
| 2012/0281019 A1 | 11/2012 | Tamstorf et al. |
| 2012/0299912 A1 | 11/2012 | Kapur et al. |
| 2012/0308087 A1 | 12/2012 | Chao et al. |
| 2012/0309520 A1 | 12/2012 | Evertt et al. |
| 2012/0310791 A1 | 12/2012 | Weerasinghe |
| 2013/0024301 A1 | 1/2013 | Mikan et al. |
| 2013/0071584 A1 | 3/2013 | Bell |
| 2013/0108121 A1 | 5/2013 | De Jong |
| 2013/0110482 A1 | 5/2013 | Ellens et al. |
| 2013/0173226 A1 | 7/2013 | Reed et al. |
| 2013/0215113 A1 | 8/2013 | Corazza et al. |
| 2013/0215116 A1 | 8/2013 | Siddique et al. |
| 2013/0246222 A1 | 9/2013 | Weerasinghe |
| 2013/0258045 A1 | 10/2013 | Wojciech |
| 2013/0268399 A1 | 10/2013 | Lu et al. |
| 2013/0317944 A1 | 11/2013 | Huang et al. |
| 2014/0035913 A1 | 2/2014 | Higgins et al. |
| 2014/0040041 A1 | 2/2014 | Ohnemus et al. |
| 2014/0095348 A1 | 4/2014 | Goulart |
| 2014/0114620 A1 | 4/2014 | Grinspun et al. |
| 2014/0114884 A1 | 4/2014 | Daway |
| 2014/0129381 A1 | 5/2014 | Fries |
| 2014/0129390 A1 | 5/2014 | Mauge et al. |
| 2014/0164902 A1 | 6/2014 | Sager |
| 2014/0176565 A1 | 6/2014 | Adeyoola et al. |
| 2014/0180864 A1 | 6/2014 | Orlov et al. |
| 2014/0257993 A1 | 9/2014 | Paolini |
| 2014/0267717 A1 | 9/2014 | Pitzer et al. |
| 2014/0270540 A1 | 9/2014 | Spector et al. |
| 2014/0279200 A1 | 9/2014 | Hosein et al. |
| 2014/0279289 A1 | 9/2014 | Steermann |
| 2014/0282721 A1 | 9/2014 | Kuncl et al. |
| 2014/0313192 A1 | 10/2014 | Corazza et al. |
| 2014/0333614 A1 | 11/2014 | Black et al. |
| 2014/0368499 A1 | 12/2014 | Kaur |
| 2015/0130795 A1 | 5/2015 | Chhugani et al. |
| 2015/0134302 A1 | 5/2015 | Chhugani et al. |
| 2015/0134493 A1 | 5/2015 | Su et al. |
| 2015/0134494 A1 | 5/2015 | Su et al. |
| 2015/0134495 A1 | 5/2015 | Naware et al. |
| 2015/0134496 A1 | 5/2015 | Grinblat et al. |
| 2015/0154691 A1 | 6/2015 | Curry et al. |
| 2015/0186977 A1 | 7/2015 | Leonard et al. |
| 2015/0366504 A1 | 12/2015 | Connor |
| 2016/0029706 A1 | 2/2016 | Braverman |
| 2016/0035061 A1 | 2/2016 | Gadre et al. |
| 2016/0063588 A1 | 3/2016 | Gadre et al. |
| 2016/0088284 A1 | 3/2016 | Sareen et al. |
| 2016/0092956 A1 | 3/2016 | Su et al. |
| 2016/0117749 A1 | 4/2016 | Desmarais et al. |
| 2016/0155186 A1 | 6/2016 | Su et al. |
| 2016/0165988 A1 | 6/2016 | Glasgow et al. |
| 2016/0165989 A1 | 6/2016 | Glasgow et al. |
| 2016/0171583 A1 | 6/2016 | Glasgow et al. |
| 2016/0180447 A1 | 6/2016 | Kamalie et al. |
| 2016/0180449 A1 | 6/2016 | Naware et al. |
| 2016/0180562 A1 | 6/2016 | Naware et al. |
| 2016/0210602 A1 | 7/2016 | Siddique et al. |
| 2016/0239889 A1 | 8/2016 | Nuzzi |
| 2016/0247017 A1 | 8/2016 | Sareen et al. |
| 2016/0249699 A1 | 9/2016 | Inghirami |
| 2016/0292779 A1 | 10/2016 | Rose et al. |
| 2016/0292915 A1 | 10/2016 | Chhugani et al. |
| 2017/0004567 A1 | 1/2017 | Dutt et al. |
| 2017/0161948 A1 | 6/2017 | Hua et al. |
| 2018/0197331 A1 | 7/2018 | Chen et al. |
| 2018/0350140 A1 | 12/2018 | Su et al. |
| 2019/0057428 A1 | 2/2019 | Su et al. |
| 2019/0130649 A1 | 5/2019 | O'Brien et al. |

FOREIGN PATENT DOCUMENTS

| | | | |
|---|---|---|---|
| AU | 2012240481 | B2 | 8/2015 |
| AU | 2015255283 | B2 | 4/2017 |
| CN | 102842089 | A | 12/2012 |
| CN | 103455501 | A | 12/2013 |
| CN | 103605832 | A | 2/2014 |
| DE | 4425271 | A1 | 1/1996 |
| DE | 19628045 | A1 | 1/1998 |
| DE | 19634418 | A1 | 3/1998 |
| DE | 19922150 | A1 | 11/2000 |
| DE | 19926472 | A1 | 12/2000 |
| DE | 10022973 | A1 | 2/2001 |
| EP | 0527639 | A2 | 2/1993 |
| EP | 0216521 | B1 | 11/1993 |
| EP | 0519843 | A3 | 2/1994 |
| EP | 0693742 | A2 | 1/1996 |
| EP | 0400911 | B1 | 11/1996 |
| EP | 0848360 | A1 | 6/1998 |
| EP | 2091015 | A1 | 8/2009 |
| EP | 2187325 | A1 | 5/2010 |
| IT | 2012A000628 | A1 | 5/2014 |
| JP | 2004-519748 | A | 7/2004 |
| JP | 2008-257747 | A | 10/2008 |
| JP | 2010-124604 | A | 6/2010 |
| KR | 10-2003-0097465 | A | 12/2003 |
| KR | 10-2010-0015465 | A | 2/2010 |
| KR | 10-2010-0053646 | A | 5/2010 |
| KR | 10-2010-0058356 | A | 6/2010 |
| KR | 10-1606623 | B1 | 3/2016 |
| KR | 10-1775855 | B1 | 9/2017 |
| WO | 95/06294 | A1 | 3/1995 |
| WO | 95/16971 | A1 | 6/1995 |
| WO | 96/38813 | A1 | 12/1996 |
| WO | 97/10560 | A1 | 3/1997 |
| WO | 97/13228 | A1 | 4/1997 |
| WO | 99/08242 | A1 | 2/1999 |
| WO | 99/66436 | A1 | 12/1999 |
| WO | 00/77754 | A1 | 12/2000 |
| WO | 02/05224 | A2 | 1/2002 |
| WO | 02/05224 | A3 | 7/2003 |
| WO | 2010/060113 | A1 | 5/2010 |

(56) References Cited

FOREIGN PATENT DOCUMENTS

| WO | 2012/110828 A1 | 8/2012 |
|---|---|---|
| WO | 2012/138483 A1 | 10/2012 |
| WO | 2013/188908 A1 | 12/2013 |
| WO | 2014/182545 A1 | 11/2014 |
| WO | 2016/106126 A1 | 6/2016 |
| WO | 2016/106193 A1 | 6/2016 |
| WO | 2016/106216 A2 | 6/2016 |
| WO | 2016/106216 A3 | 8/2016 |
| WO | 2016/160776 A1 | 10/2016 |

OTHER PUBLICATIONS

Wikipedia, "Sequential Minimal Optimization," Retrieved from Internet URL: https://en.wikipedia.org/wiki/Sequential_minimal_optimization, Accessed on Mar. 26, 2020, 3 pages.
Response to First Office Action Interview—Office Action filed on May 15, 2017, for U.S. Appl. No. 14/568,187, dated Mar. 13, 2017, 11 pages.
Response to Pre-Interview First Office Action filed on Oct. 31, 2016, for U.S. Appl. No. 14/568,187, dated Oct. 6, 2016, 3 pages.
Non Final Office Action received for U.S. Appl. No. 14/568,251, dated Jun. 2, 2017, 24 pages.
Applicant Initiated Interview Summary received for U.S. Appl. No. 14/569,197, dated Apr. 28, 2017, 2 pages.
First Action Interview Office Action received for U.S. Appl. No. 14/569,197, dated Jun. 1, 2017, 5 pages.
Pre-Interview First Office Action received for U.S. Appl. No. 14/569,197, dated Oct. 11, 2016, 5 pages.
Response to First Action Interview—Pre-Interview Communication filed on Oct. 31, 2016, for U.S. Appl. No. 14/569,197, dated Oct. 11, 2016, 3 pages.
Applicant Interview Summary received for U.S. Appl. No. 14/578,414, dated Jun. 7, 2017, 3 pages.
Non-Final Office Action received for U.S. Appl. No. 14/578,414, dated Mar. 9, 2017, 26 pages.
Response to Non-Final Office Action filed on May 31, 2017, for U.S. Appl. No. 14/578,414, dated Mar. 9, 2017, 17 pages.
Final Office Action received for U.S. Appl. No. 14/579,936, dated Jun. 27, 2018, 18 pages.
Final Office Action received for U.S. Appl. No. 14/579,936, dated Jul. 10, 2017, 25 pages.
Non-Final Office Action received for U.S. Appl. No. 14/579,936, dated Jan. 8, 2018, 15 pages.
Non-Final Office Action received for U.S. Appl. No. 14/579,936, dated Mar. 24, 2017, 36 pages.
Response to Final Office Action filed on Dec. 1, 2017, for U.S. Appl. No. 14/579,936, dated Jul. 10, 2017, 16 pages.
Response to Non Final Office Action filed on May 31, 2017, for U.S. Appl. No. 14/579,936, dated Mar. 24, 2017, 19 pages.
Response to Non-Final Office Action filed on Apr. 4, 2018, for U.S. Appl. No. 14/579,936, dated Jan. 8, 2018, 29 pages.
Applicant Interview Summary received for U.S. Appl. No. 14/580,072, dated Feb. 1, 2017, 3 pages.
Final Office Action received for U.S. Appl. No. 14/580,072, dated Jun. 16, 2017, 35 pages.
First Action Interview—Office Action Summary received for U.S. Appl. No. 14/580,072, dated Jan. 27, 2017, 4 pages.
First Action Interview—Pre-Interview Communication mailed for U.S. Appl. No. 14/580,072, dated Oct. 12, 2016, 6 pages.
Response to First Action Interview filed on Mar. 27, 2017, for U.S. Appl. No. 14/580,072, dated Jan. 27, 2017, 11 pages.
Applicant Initiated Interview Summary for U.S. Appl. No. 15/182,267, dated Jan. 6, 2017, 3 pages.
Final Office Action received for U.S. Appl. No. 15/182,267, dated Mar. 8, 2017, 11 pages.
Non-Final Office Action received for U.S. Appl. No. 15/182,267, dated Aug. 31, 2017, 13 pages.
Non-Final Office Action received for U.S. Appl. No. 15/182,267, dated Sep. 12, 2016, 10 pages.
Notice of Allowance received for U.S. Appl. No. 15/182,267, dated Dec. 20, 2017, 8 Pages.
Preliminary Amendment Filed for U.S. Appl. No. 15/182,267, dated Jul. 14, 2016, 7 pages.
Response to Final Office Action filed on Apr. 25, 2017, for U.S. Appl. No. 15/182,267, dated Mar. 38, 2017, 9 pages.
Response to Non-Final Office Action filed on Feb. 13, 2017, for U.S. Appl. No. 15/182,267, dated Sep. 12, 2017, 8 pages.
Response to Non-Final Office Action filed on Nov. 30, 2017, for U.S. Appl. No. 15/182,267, dated Aug. 31, 2017, 11 pages.
Jojic, et al., "A framework for garment shopping over the Internet," Handbook on Electronic Commerce, 2000, 22 pages.
A World Away, "Selena Mell Sends Home Her First Impressions of a New Life in the United Arab Emirates", Community, Nov. 25, 2011, 3 pages.
Basenese, "Virtual Fitting Rooms . . . Coming to a Store Near You", Retrieved from the Internet URL:<https://www.wallstreetdaily.com/2011/07/07/virtual-fitting-rooms-fits-mel>, Jul. 7, 2011, 1 page.
Binkley, "The Goal: A Perfect First-Time Fit: True Fit Is Online Retailers Latest Attempt to Help Consumers Buy Rigilt Size; No Tape Measures", Retrieved from the Internet<URL:http://online.wsj.cominewslarticies/SB10001424052702304724404577293593210807790#printMode>, Mar. 23, 2012, 4 pages.
Bossard et al., "Apparel classification with style", Retrieved from the Internet URL:<http://www.vision.ee.ethz.ch/~lbossard/bossard_accv12_apparel-classification-with-style.pdf>, 2012, pp. 1-14.
Bryant, "Fits.me Launches Robot to Help Women Size Up Clothes Online", Retrieved from the Internet URL : <https://thenextweb.com/eu/2011/06/10/fits-me-launches-robot-to-help-women-size-up-clothes-online/#tnw_BRXPLr8L>, Jun. 10, 2011, 4 pages.
Chang, "Virtual dressing rooms changing the shape of clothes shopping", Retrieved from the Internet URL: <https://phys.org/news/2012-07-virtual-rooms.html>, Jul. 23, 2012, 3 pages.
Chang, "Virtual Fitting Rooms Changing the Clothes Shopping Experience", Retrieved from the internet URL:<http://articles.latimes.com/2012/jul/13/business/la-fi-virtual-dressing-room-20120714>, Jul. 13, 2012, 3 pages.
Cheng et al., "A 3D Virtual Show Room for Online Apparel Retail Shop", In Proceedings: APSIPA ASC 2009: Asia-Pacific Signal and Information Processing Association, Annual Summit and Conference, Retrieved from the Internet URL: < http://www.apsipa.org>, Oct. 4-7, 2009, pp. 193-199.
Criminisi et al., "Single View Metrology", International Journal of Computer Vision, vol. 40, Issue 2, 2000, pp. 123-148.
Decaudin et al., "Virtual garments: A fully geometric approach for clothing design", In Computer Graphics Forum, Oxford, UK and Boston, USA: Blackwell Publishing, Inc, vol. 25, No. 3, 2006, pp. 625-634.
Feng et al., "A deformation transformer for real-time cloth animation", Retrieved from the internet URL:<http://i.cs.hku.hk/~yzyu/publication/dtcloth-sig2010.pdf>, Jul. 2010, 1-9 pp.
Fuhrmann et al., "Interaction-free dressing of virtual humans", Computers & Graphics 27, No. 1, 2003, pp. 71-82.
Gioberto, "Garment-Integrated Wearable Sensing for Knee Joint Monitoring", Proceedings of the 2014 ACM International Symposium on Wearable Computers: Adjunct Program, Sep. 13-17, 2014, 113-118 pages.
Gioberto et al., "Overlock-Stitched Stretch Sensors: Characterization and Effect of Fabric Property", Journal of Textile and Apparel, Technology and Management, vol. 8, Issue 3, 2013, 14 pages.
Harwood et al., "The Use of the Kawabata Evaluation System for Product Development and Quality Control", Dept of Technology, Scottish College of Textiles, Galashiels, Selkirkshire, Scotland TDI 3HF, Journal of the Society of Dyers and Colourists, vol. 106, No. 2, Feb. 1990, pp. 64-68.
Hughes et al., "Physical simulation for animation and visual effects: parallelization and characterization for chip multiprocessors", In ACM SIGARCH Computer Architecture News, vol. 35, No. 2, May 2007, pp. 220-231.
Jassim, "Semi-Optimal Edge Detector based on Simple Standard Deviation with Adjusted Thresholding", International Journal of Computer Applications 68, No. 2, 2013, pp. 43-48.

(56) References Cited

OTHER PUBLICATIONS

Yang et al., "Detailed garment recovery from a single-view image", Retrieved from the internet URL:<https://arxiv.org/pdf/1608.01250.pdf>, 2016, pp. 1-13.
Karsch et al., "Rendering synthetic objects into legacy photographs", ACM Transactions on Graphics (TOG). vol. 30. No. 6, 2011, 12 pages.
Krashinsky, "Vector-Thread Architecture and Implementation", Retrieved from the internet URL:<http://scale.eecs.berkeley.edu/papers/krashinsky-phd.pdf>, May 2007, pp. 1-186.
Kristensen et al., "Towards a Next Generation Universally Accesible 'Online Shopping-for-Apparel' System", Retrieved from the internet URL:<http://vbn.aau.dk/files/78490156VDR_paper_from_HCII2013_V03_LNCS8006_978_3_642_39264_1.pdf>, 2013, pp. 418-427.
Li et al., "Wearable Sensors in Intelligent Clothing for Measuring Human Body Temperature Based on Optical Fiber Bragg Grating", Retrieved from the Internet <URL: htp://ro.uow.edu.au/eispapers/298>, Optics Express, vol. 20, Issue 11, May 9, 2012, pp. 11740-11752.
Lim et al., "Characterization of noise in digital photographs for image processing", https://www.spiedigitallibrary.org/conference-proceedings-of-spie/6069/60690O/Characterization-of-noise-in-digital-photographs-for-image-processing/10.1117/12.655915.short, Feb. 10, 2006, 10 pages.
Luo et al., "Reactive 2D/3D garment pattern design modification", Computer-Aided Design, vol. 37, No. 6, May 2005, pp. 623-630.
Mcdonnell et al., "Pipeline for Populating Games with Realistic Crowds", Int. J. Intell Games & Simulation 4, No. 2, Oct. 31, 2018, 16 pages.
Niceinteractive, "Virtual Dressing Room", Retrieved from the Internet: <URL: https://www.youtube.com/watch?v=UhOzN2z3wtl>, Aug. 3, 2017, 2 pages.
O'Brien, "Fits.me—Imitates Ladies of All Shapes and Sixes, Tries Clothes on for you (video)", Retrived from the internet URL:<https://www.engadget.com/2011/06/13/fits-me-imitates-ladies-of-all-shapes-and-sizes-tries-clothes-o/>, Jun. 13, 2011, 10 pages.
Okreylos, "3D Video Capture with Three Kinects", Retrieved from the Internet URL: <https://www.youtube.com/watch?v=Ghgbycqb92c>, May 13, 2014, 3 pages.
International Search Report received for PCT Application No. PCT/US2015/067009, dated Feb. 26, 2016, 2 pages.
Written Opinion received for PCT Application No. PCT/US2015/067009, dated Feb. 26, 2016, 6 pages.
International Preliminary Report on Patentability received for PCT Patent Application No. PCT/US2015/067044, dated Jul. 6, 2017, 9 pages.
International Search Report received for PCT Patent Application No. PCT/US2015/067044, dated Mar. 11, 2016, 2 pages.
Written Opinion received for PCT Application No. PCT/US2015/067044, dated Mar. 11, 2016, 7 pages.
International Preliminary Report on Patentability received for PCT Patent Application No. PCT/US2015/067106, dated Jul. 6, 2017, 15 pages.
International Search Report received for PCT Application No. PCT/US2015/067106, dated Jul. 5, 2016, 3 pages.
Written Opinion received for PCT Application No. PCT/US2015/067106, dated Jul. 5, 2016, 13 pages.
International Preliminary Report on Patentability received for PCT Application No. PCT/US2016/024659, dated Oct. 12, 2017, 8 pages.
International Search Report received for PCT Patent Application No. PCT/US2016/024659, dated Jun. 10, 2016, 2 pages.
Written Opinion received for PCT Application No. PCT/US2016/024659, dated Jun. 10, 2016, 6 pages.
Photoshop, "Placing an Image Inside of Another With Photoshop CS6", Retrieved from the internet: <URL: http://www.photoshopessentials.com/photo-effects/placing-an-image-inside-another-with-photoshop-cs6/>, Sep. 9, 2014, 8 pages.
Rudolph et al., "A Simple Load Balancing Scheme for Task Allocation in Parallel Machines", Retrieved from the internet URL:<http://people.csail.mit.edu/rudolph/Autobiography/LoadBalancing.pdf>, 1991, 237-245 pp.
Satish et al., "IEEE Xplore Abstact—Can traditional programming bridge the Ninja ! ! !performance gap for parallel computing applications?" 2012, 12 pages.
Selle et al., "Robust High-Resolution Cloth Using Parallelism, History-Based Collisions and Accurate Friction", IEEE Transactions on Visualization and Computer Graphics, vol. 15, No. 2, 2009, Mar.-Apr. 2009, pp. 1-12.
Spanlang, "Garment Modelling and Visualisation", PhD dissertation, University of London, 2005, 220 pages.
Styku, "Styku Startup Revolutionizes Apparel Shopping, Reduces Returns with Virtual Filling Room", Retrieved from the internet URL:<file:///C/Users/swadhwa/Downloads/Styku_Kinect_CaseStudy%20(1).pdf>, Nov. 6, 2012, 4 pages.
Telstra Corporation Ltd, "In the Matter of Australian Application Serial No. 2001271968, in the name of PayPal, Inc-and-In the Matter of Opposition to the Application by Telstra Corporation Limited" "Statement of Grounds of Opposition and Particulars Relating to Each Ground", Sep. 17, 2007, 8 pages.
Notice of Decision to Grant Received for Korean Patent Application No. 10-2013-7029353, dated Dec. 24, 2015, 3 pages (1 page of English Translation and 2 pages of Official Copy).
Notice of Preliminary Rejection for Korean Patent Application No. 10-2013-7029353, dated Apr. 28, 2015, 10 pages (5 pages of English Translation and 5 pages of Official Copy).
Response to Notice of Preliminary Rejection filed on Jul. 28, 2015 for Korean Patent Application No. 10-2013-7029353, dated Apr. 28, 2015, 22 pages (18 pages of Official Copy and 4 pages of English Translation of Claims).
Final Office Action received for Korean Patent Application No. 10-2016-7006944, dated Jan. 31, 2017, 5 pages (2 pages of English Translation and 3 pages of Official Copy).
Office Action received for Korean Patent Application No. 10-2016-7006944, dated Jun. 14, 2016, 6 pages (3 pages of English Translation and 3 pages of Official Copy).
Response to Office Action filed on Sep. 9, 2016 for Korean Patent Application No. 2016-7006944, dated Jun. 14, 2016, 17 pages (13 pages of Official Copy and 4 pages of English Translation of Claims).
Notice of Allowance received for Korea Patent Application No. 10-2017-7024399, dated Jun. 22, 2018, 3 pages (1 page of English Translation and 2 pages of Official Copy).
Notice of Preliminary Rejection received for Korean Patent Application No. 10-2017-7024399, dated Dec. 4, 2017, 5 pages (2 pages of English Translation and 3 pages of Official Copy).
Response to Notice of Preliminary Rejection filed on Feb. 2, 2018 for Korean Patent Application No. 10-2017-7024399, dated Dec. 4, 2017, 17 pages (13 pages of Official Copy and 4 pages of English Claims).
Appeal Brief for U.S. Appl. No. 13/081,367, filed Feb. 14, 2013, 21 pages.
Appeal Decision received for U.S. Appl. No. 13/081,367, dated Mar. 1, 2016, 10 pages.
Examiner's Answer received for U.S. Appl. No. 13/081,367, dated Apr. 12, 2013, 5 pages.
Examiner's Answer received for U.S. Appl. No. 13/081,367, dated Apr. 18, 2013, 8 pages.
Final Office Action received for U.S. Appl. No. 13/081,367, dated Jun. 14, 2012, 14 pages.
Non-Final Office Action received for U.S. Appl. No. 13/081,367, dated Feb. 8, 2012, 15 pages.
Response to Non-Final Office Action filed on May 8, 2012, for U.S. Appl. No. 13/081,367, dated Feb. 8, 2012, 9 pages.
Advisory Action received for U.S. Appl. No. 14/579,936, dated Sep. 12, 2018, 3 pages.
Applicant Initiated Interview Summary Received for U.S. Appl. No. 14/579,936, dated Jan. 14, 2019, 3 pages.
Applicant Initiated Interview Summary received for U.S. Appl. No. 14/579,936, dated Aug. 15, 2018, 3 pages.

(56) References Cited

OTHER PUBLICATIONS

Applicant-Initiated Interview Summary received for U.S. Appl. No. 14/579,936, dated Sep. 12, 2018, 3 pages.
Non-Final Office Action received for U.S. Appl. No. 14/579,936, dated Oct. 25, 2018, 21 pages.
Notice of Allowability Received for U.S. Appl. No. 14/579,936, dated Apr. 9, 2019, 6 pages.
Notice of Allowance received for U.S. Appl. No. 14/579,936, dated Mar. 15, 2019, 9 pages.
Response to Advisory Action filed on Sep. 27, 2018, for U.S. Appl. No. 14/579,936, dated Sep. 12, 2018, 22 pages.
Response to Final Office Action filed on Aug. 27, 2018, for U.S. Appl. No. 14/579,936, dated Jun. 27, 2018, 20 pages.
Response to Non-Final Office Action filed on Jan. 25, 2019, for U.S. Appl. No. 14/579,936, dated Oct. 25, 2018, 20 pages.
First Action Interview—Office Action Summary received for U.S. Appl. No. 15/140,900, dated Feb. 28, 2019, 33 pages.
First Action Interview—Pre-Interview Communcation received for U.S. Appl. No. 15/140,900 dated Dec. 13, 2018, 30 pages.
Preliminary Amendment filed for U.S. Appl. No. 15/140,900, dated Aug. 1, 2016, 6 pages.
Response to First Action Interview—Pre-Interview Communication filed on Jan. 14, 2019, for U.S. Appl. No. 15/140,900, dated Dec. 13, 2018, 9 pages.
Response to First Action Interview—OA Summary filed on Jun. 21, 2019 for U.S. Appl. No. 15/140,900, dated Feb. 28, 2019, 18 pages.
Non-Final Office Action received for U.S. Appl. No. 16/054,139, dated Nov. 1, 2018, 16 pages.
Notice of Allowance received for U.S. Appl. No. 16/054,139, dated Mar. 1, 2019, 9 pages.
Notice of Allowance received for U.S. Appl. No. 16/054,139, dated Apr. 19, 2019, 9 pages.
Preliminary Amendment filed on Aug. 27, 2018, for U.S. Appl. No. 16/054,139, 8 pages.
Response to Non-Final Office Action filed on Jan. 29, 2019, for U.S. Appl. No. 16/054,139, dated Nov. 1, 2018, 12 pages.
Notice of Allowance Received for Canadian Patent Application No. 2,832,000 dated Feb. 22, 2018, 1 page.
Office Action Received for Canadian Patent Application No. 2,832,000 dated Mar. 31, 2017, 5 pages.
Office Action received for Canadian patent Application No. 2,832,000, dated Jun. 21, 2019, 3 pages.
Office Action received for Canadian Patent Application No. 2,832,000, dated Mar. 22, 2016, 4 pages.
Office Action received for Canadian Patent Application No. 2,832,000, dated Mar. 27, 2015, 3 pages.
Office Action received for Canadian Patent Application No. 2,832,000, dated Oct. 23, 2018, 5 pages.
Response to Office Action filed on Dec. 28, 2018, for Canadian Patent Application No. 2,832,000, dated Oct. 23, 2018, 11 pages.
Response to Office Action filed on Sep. 23, 2015, for Canadian Patent Application No. 2,832,000, dated Mar. 27, 2015, 13 pages.
Response to Office Action dated Aug. 30, 2017 received for Canadian Patent Application No. 2,832,000, dated Mar. 31, 2017, 8 pages.
Response to Office Action dated Sep. 21, 2016 received for Canadian Patent Application No. 2,832,000, dated Mar. 22, 2016, 6 pages.
First Examination Report received for Australian Patent No. 2012240481, dated Jan. 20, 2015, 3 pages.
Notice of Acceptance received for Australian Patent Application No. 2012240481 dated Aug. 4, 2015, 2 pages.
Response to First Examination Report filed on Jul. 20, 2015 for Australian Patent No. 2012240481, dated Jan. 20, 2015, 7 pages.
First Examination Report received for Australian Patent No. 2015255283, dated Nov. 9, 2016, 2 pages.
Reply Brief filed on Jun. 12, 2013, for U.S. Appl. No. 13/081,367, 9 pages.
Applicant Initiated Interview Summary received received for U.S. Appl. No. 13/722,818, dated Feb. 20, 2015, 3 pages.
Final Office Action received for U.S. Appl. No. 13/722,818 dated Apr. 15, 2015, 16 pages.
Final Office Action received for U.S. Appl. No. 13/722,818, dated Jul. 11, 2016, 23 pages.
Non-Final Office Action received for U.S. Appl. No. 13/722,818 dated Dec. 17, 2015, 21 pages.
Non-Final Office Action received for U.S. Appl. No. 13/722,818 dated Mar. 24, 2014, 22 pages.
Non-Final Office Action received for U.S. Appl. No. 13/722,818 dated Sep. 12, 2014, 16 pages.
Response to Final Office Action filed on Oct. 15, 2015 for U.S. Appl. No. 13/722,818, dated Apr. 15, 2015, 15 pages.
Response to Non-Final Office Action filed on Aug. 25, 2014, for U.S. Appl. No. 13/722,818, dated Mar. 24, 2014, 14 pages.
Response to Non-Final Office Action filed on Feb. 12, 2015 for U.S. Appl. No. 13/722,818, dated Sep. 12, 2014, 25 pages.
Response to Non-Final Office Action filed on Jun. 17, 2016 for U.S. Appl. No. 13/722,818, dated Dec. 17, 2015, 17 pages.
Applicant Interview Summary received for U.S. Appl. No. 14/270,244, dated Aug. 17, 2017, 3 pages.
Applicant Initiated Interview Summary received for U.S. Appl. No. 14/270,244, dated Apr. 6, 2017, 5 pages.
Applicant Initiated Interview Summary received for U.S. Appl. No. 14/270,244, dated Jan. 22, 2019, 3 pages.
Final Office Action received for U.S. Appl. No. 14/270,244, dated Jul. 14, 2017, 37 pages.
Final Office Action received for U.S. Appl. No. 14/270,244, dated Jun. 17, 2019, 32 pages.
Non Final Office Action received for U.S. Appl. No. 14/270,244, dated Dec. 5, 2018, 35 pages.
Non-Final Office Action received for U.S. Appl. No. 14/270,244, dated Jan. 12, 2017, 35 pages.
Response to Final Office Action filed on Sep. 6, 2017 for U.S. Appl. No. 14/270,244, dated Jul. 14, 2017, 15 pages.
Response to Non-Final Office Action filed on Apr. 4, 2017, for U.S. Appl. No. 14/270,244, dated Jan. 12, 2017, 12 pages.
Response to Non-Final Office Action filed on Mar. 8, 2019, for U.S. Appl. No. 14/270,244, dated Dec. 5, 2018, 18 pages.
Applicant Initiated Interview Summary Received for U.S. Appl. No. 14/449,120 dated Apr. 21, 2017, 3 pages.
Applicant Initiated Interview Summary received for U.S. Appl. No. 14/449,120, dated Oct. 27, 2017, 3 pages.
Final Office Action received for U.S. Appl. No. 14/449,120, dated Jul. 27, 2017, 38 pages.
Non-Final Office Action received for U.S. Appl. No. 14/449,120, dated Feb. 8, 2017, 32 pages.
Response to Non-Final Office Action filed on Apr. 19, 2017 for U.S. Appl. No. 14/449,120 dated Feb. 8, 2017, 13 pages.
Applicant Interview Summary received for U.S. Appl. No. 14/474,003, dated Oct. 25, 2017, 3 pages.
Applicant Initiated Interview Summary received for U.S. Appl. No. 14/474,003, dated Mar. 5, 2018, 3 pages.
Final Office Action received for U.S. Appl. No. 14/474,003, dated Jan. 24, 2018, 23 pages.
Non-Final Office Action received for U.S. Appl. No. 14/474,003, dated Jul. 28, 2017, 25 pages.
Notice of Allowance Received for U.S. Appl. No. 14/474,003 dated Apr. 27, 2018, 10 pages.
Preliminary Amendment filed for U.S. Appl. No. 14/474,003, dated Oct. 3, 2014, 3 pages.
Response to Final Office Action filed on Mar. 26, 2018, for U.S. Appl. No. 14/474,003, dated Jan. 24, 2018, 14 pages.
Response to Non-Final Office Action filed on Oct. 30, 2017 for U.S. Appl. No. 14/474,003, dated Jul. 28, 2017, 17 pages.
Applicant Interview Summary received for U.S. Appl. No. 14/503,287, dated Oct. 27, 2017, 3 pages.
Final Office Action received for U.S. Appl. No. 14/503,287, dated Mar. 16, 2018, 50 pages.
Non Final Office Action received for U.S. Appl. No. 14/503,287, dated Aug. 24, 2017, 39 pages.
Response to Non Final Office Action filed on Jan. 4, 2018, for U.S. Appl. No. 14/503,287, dated Aug. 24, 2017, 16 pages.

(56) References Cited

OTHER PUBLICATIONS

Applicant-Initiated Interview Summary Received for U.S. Appl. No. 14/503,309 dated Mar. 20, 2018, 3 pages.
Non-Compliant Notice for U.S. Appl. No. 14/503,309, dated Dec. 21, 2017, 6 pages.
Non-Final Office Action received for U.S. Appl. No. 14/503,309, dated May 23, 2018, 14 pages.
Response to Non-Compliant Amendment (Extendible) filed on Apr. 18, 2018, for U.S. Appl. No. 14/503,309, dated Dec. 21, 2017, 10 pages.
Response to to Restriction Requirement filed on Nov. 13, 2017, for U.S. Appl. No. 14/503,309, dated Sep. 13, 2017, 10 pages.
Restriction Requirement received for U.S. Appl. No. 14/503,309, dated Sep. 13, 2017, 7 pages.
Non-Final Office Action received for U.S. Appl. No. 14/530,636, dated Nov. 5, 2015, 6 pages.
Notice of Allowance received for U.S. Appl. No. 14/530,636, dated Mar. 28, 2016, 8 pages.
Response to Non-Final Office Action filed on Mar. 7, 2016, for U.S. Appl. No. 14/530,636, dated Nov. 5, 2015, 8 pages.
Non-Final Office Action received for U.S. Appl. No. 14/556,677 dated May 18, 2017, 12 pages.
First Action Interview Office Action received for U.S. Appl. No. 14/568,187 dated Mar. 13, 2017, 3 pages.
Pre-Interview First Office Action received for U.S. Appl. No. 14/568,187, dated Oct. 6, 2016, 5 pages.
Response to Examination Report filed on Nov. 17, 2016, for Australian Patent Application No. 2015255283, dated Nov. 9, 2016, 1 page.
Response to Subsequent Examination Report filed on Mar. 20, 2017, for Australian Patent Application No. 2015255283, dated Dec. 15, 2016, 13 pages.
Subsequent Examiners Report received for Australian Serial No. 2015255283, dated Dec. 15, 2016, 4 pages.
Automated Clearing House Rules, "A Complete Guide to Rules and Regulations Governing the ACH Network", The National Autorned Clearing House Assocation, 1999, 627 pages.
Horne, "Letter from Gowling Lafleur Henderson LLP to Park, Vaughan and Fleming LLP," Jul. 21, 2004, 3 pages.
Dregon, "ACH Debit Electronic Funds Transfer: Program Guide," Retrieved from the Internet URL: http://www.dor.state.or.us/19forms/206-029.pdf>, Feb. 1999, 8 pages.
International Preliminary Report on Patentability received for PCT Patent Application No. PCT/US2012/030179, dated Oct. 17, 2013, 6 pages.
International Search Report received for PCT Patent Application No. PCT/US2012/030179, dated Apr. 13, 2012, 4 pages.
Written Opinion received for PCT Patent Application No. PCT/US2012/030179, dated Apr. 13, 2012, 4 pages.
Corrected Notice of Allowability received for U.S. Appl. No. 16/054,139, dated Aug. 1, 2019, 2 pages.
Non-Final Office Action received for U.S. Appl. No. 16/167,867, dated Jun. 26, 2020, 25 pages.
02Micro Inc Files Taiwan Patent Application for Method and Device for Electronic Fitting, Global IP News.Electronics Patent News Retrieved from Dialog on Nov. 4, 2020, Dec. 26, 2013, 1 Page.
Final Office Action Received for U.S. Appl. No. 16/167,867, dated Nov. 9, 2020, 33 Pages.
Notice of Allowance received for U.S. Appl. No. 16/167,867, dated Feb. 26, 2021, 11 Pages.
Corrected Notice of Allowability Received for U.S. Appl. No. 16/167,867, dated Jun. 9, 2021, 4 Pages.

* cited by examiner

EXTRACTION OF BODY DIMENSIONS FROM PLANAR GARMENT PHOTOGRAPHS OF FITTING GARMENTS

RELATED APPLICATIONS

This application is a continuation of U.S. application Ser. No. 16/054,139, filed Aug. 3, 2018, which is a continuation of U.S. application Ser. No. 14/474,003, filed Aug. 29, 2014, which claims the priority benefit of U.S. Provisional Application No. 61/905,126, filed Nov. 15, 2013; U.S. Provisional Application No. 61/904,263, filed Nov. 14, 2013; U.S. Provisional Application No. 61/904,522, filed Nov. 15, 2013; U.S. Provisional Application No. 61/905,118, filed Nov. 15, 2013; and U.S. Provisional Application No. 61/905,122, filed Nov. 15, 2013, which applications are incorporated herein by reference in their entirety.

TECHNICAL FIELD

The present application relates generally to the technical field of data processing, specifically, three-dimensional (3-D) modeling and simulation.

BACKGROUND

Shopping for clothes in physical stores can be an arduous task and, due to travelling and parking, can be very time consuming. With the advent of online shopping, consumers may purchase clothing, while staying home, via a computer or any electronic device connected to the Internet. Additionally, purchasing clothes online can be different in comparison from purchasing clothes in a store. One difference is the lack of a physical dressing room to determine if and how an article of clothing fits the particular consumer. Since different consumers can have different dimensions, seeing how an article of clothing fits, by use of a dressing room, can be a very important aspect of a successful and satisfying shopping experience.

DESCRIPTION OF EMBODIMENTS

Example systems and methods for extracting body dimensions from planar garment photographs of fitting garments are described. Additionally, the systems can determine measurement information (e.g., body parameters, dimensions and shape) based on accessed garment images of the user. In some instances, the garment images can be multiple photographs of the garment, where one of the photographs has an object of a pre-determined size.

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Reference will now be made in detail to various example embodiments, some of which are illustrated in the accompanying drawings. In the following detailed description, numerous specific details are set forth in order to provide a thorough understanding of the present disclosure and the described embodiments. However, the present disclosure may be practiced without these specific details.

Figure 1:
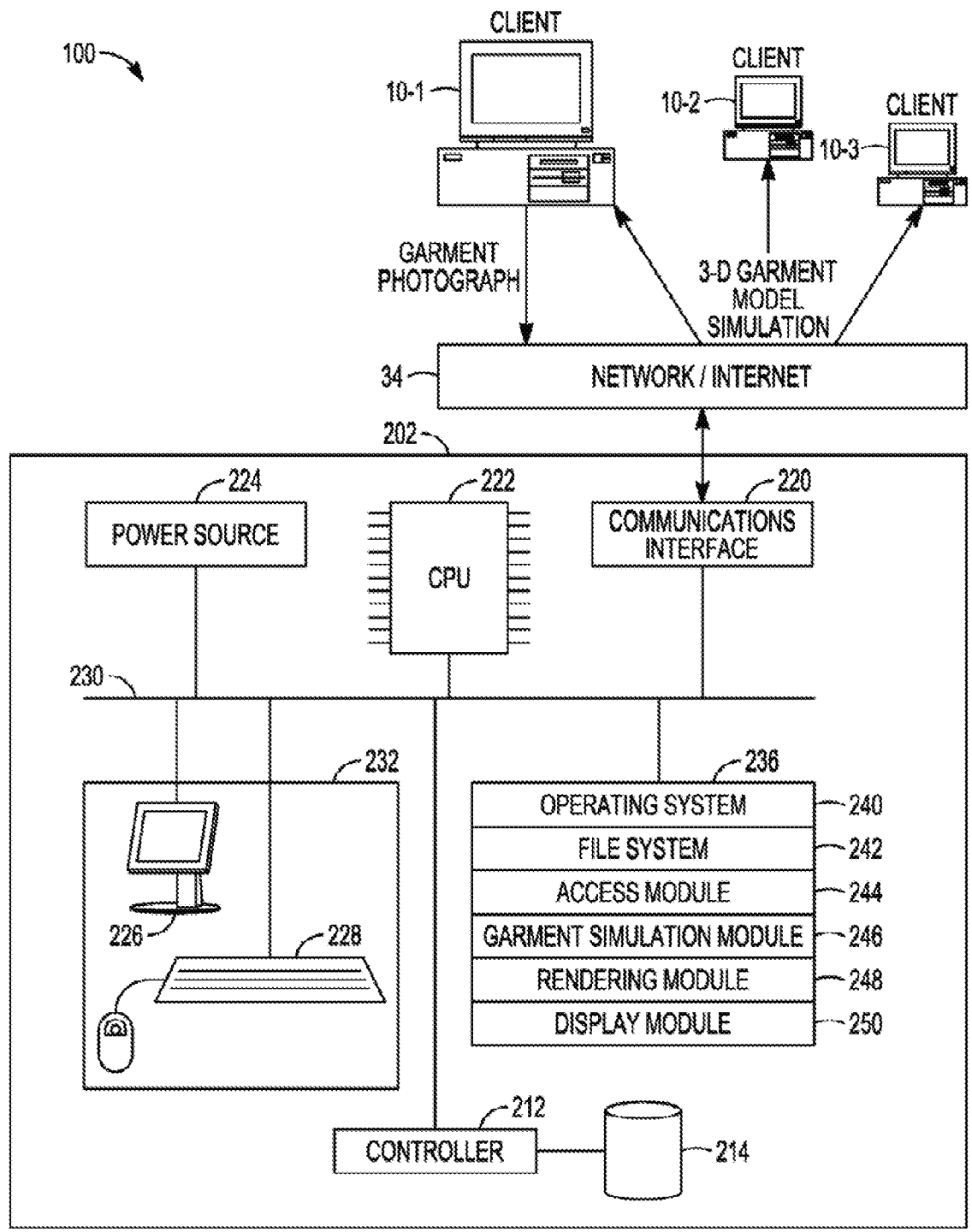
FIG. 1 illustrates an example system for extracting body dimensions from planar garment photographs, in accordance to certain example embodiments.

FIG. 1 is a block diagram illustrating a network environment 100 in accordance with example embodiments. The network environment 100 includes client devices (e.g., a client device 10-1, a client device 10-2, a client device 10-3) connected to a server 202 via a network 34 (e.g., the Internet). The server 202 may include one or more processing units (CPUs) 222 for executing software modules, programs, or instructions stored in a memory 236 and thereby performing processing operations; one or more communications interfaces 220; the memory 236; and one or more communication buses 230 for interconnecting these components. The communication buses 230 may include circuitry (e.g., a chipset) that interconnects and controls communications between system components. The server 202 also optionally includes a power source 224 and a controller 212 coupled to a mass storage 214. The network environment 100 optionally includes a user interface 232 comprising a display device 226 and a keyboard 228.

The memory 236 may include high-speed random access memory, such as dynamic random-access memory (DRAM), static random-access memory (SRAM), double data rate random-access memory (DDR RAM), or other random-access solid state memory devices. Additionally, the memory 236 may include non-volatile memory, such as one or more magnetic disk storage devices, optical disk storage devices, flash memory devices, or other non-volatile solid state storage devices. The memory 236 may optionally include one or more storage devices remotely located from the CPU 222. The memory 236, or alternately the non-volatile memory device within the memory 236, may be or include a non-transitory computer-readable storage medium. In some example embodiments, the memory 236, or the computer-readable storage medium of the memory 236, stores the following programs, modules, and data structures, or a subset thereof: an operating system 240; a file system 242; an access module 244; a garment simulation module 246; a rendering module 248; and a display module 250.

The operating system 240 is configured for handling various basic system services and for performing hardware-dependent tasks. The file system 242 can store and organize various files utilized by various programs. The access module 244 can communicate with client devices (e.g., the client device 10-1, the client device 10-2, or the client device 10-3) via the one or more communications interfaces 220 (e.g., wired, or wireless), the network 34, other wide area networks, local area networks, metropolitan area networks, and so on. Additionally, the access module 244 can access information for the memory 236 via the one or more communication buses 230.

The garment simulation module 246 can generate a 3-D body model based on the body measurements of a person. Additionally, the garment simulation module 246 can position the body model inside the garment model. Moreover, the garment simulation module 246 can calculate simulated forces acting on garment points associated with the garment model based on the positioning of the body model inside the garment model. A fit map can be determined using the calculated simulated forces. The fit map can be presented on a mobile device to tell a user the recommended size to wear based on the determination.

The rendering module 248 can generate an image of the 3-D garment model draped on the 3-D body model based on the calculated one or more simulated forces. The simulated forces can be calculated, by the rendering module 248, based on methods (e.g., three-spring implementation of a sample triangle with three vertices) described herein.

The display module 250 is configured to cause presentation of the generated image on a display of a device (e.g., client device 10-1). For example, the display module 250 can present the 3-D simulation on the display of mobile device. The 3-D simulation can be based on the actions of the garment simulation module 246 and the rendering module 248.

The network 34 may be any network that enables communication between or among machines, databases, and devices (e.g., the server 202 and the client device 10-1). Accordingly, the network 34 may be a wired network, a wireless network (e.g., a mobile or cellular network), or any suitable combination thereof. The network 34 may include one or more portions that constitute a private network, a public network (e.g., the Internet), or any suitable combination thereof. Accordingly, the network 34 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or a WiMAX network), or any suitable combination thereof. Any one or more portions of the network 34 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The server 202 and the client devices (e.g., the client device 10-1, the client device 10-2, the client device 10-3) may each be implemented in a computer system, in whole or in part, as described below with respect to FIG. 15.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 15. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Figure 2:
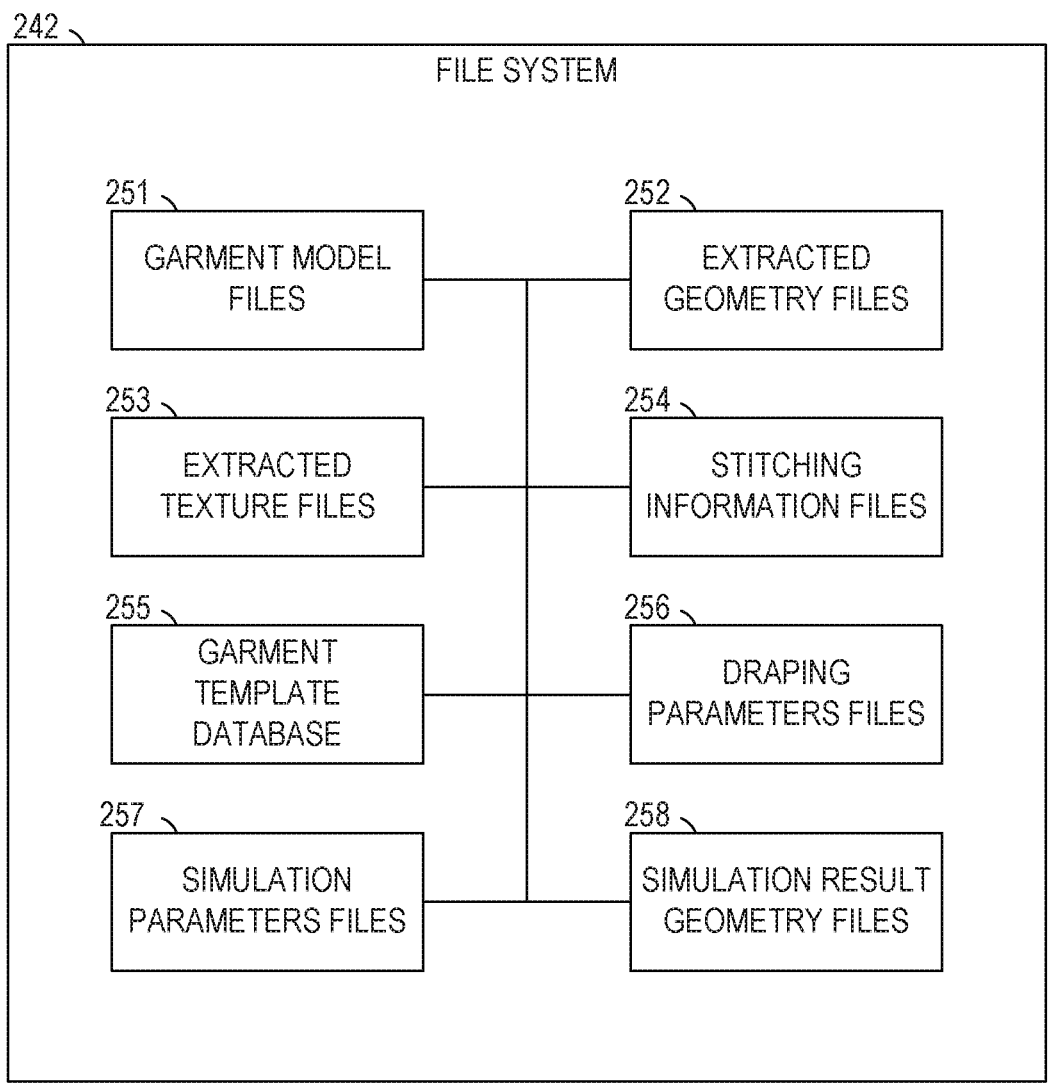
FIG. 2 is a block diagram illustrating an example file system, in accordance with certain example embodiments.
Figure 4:
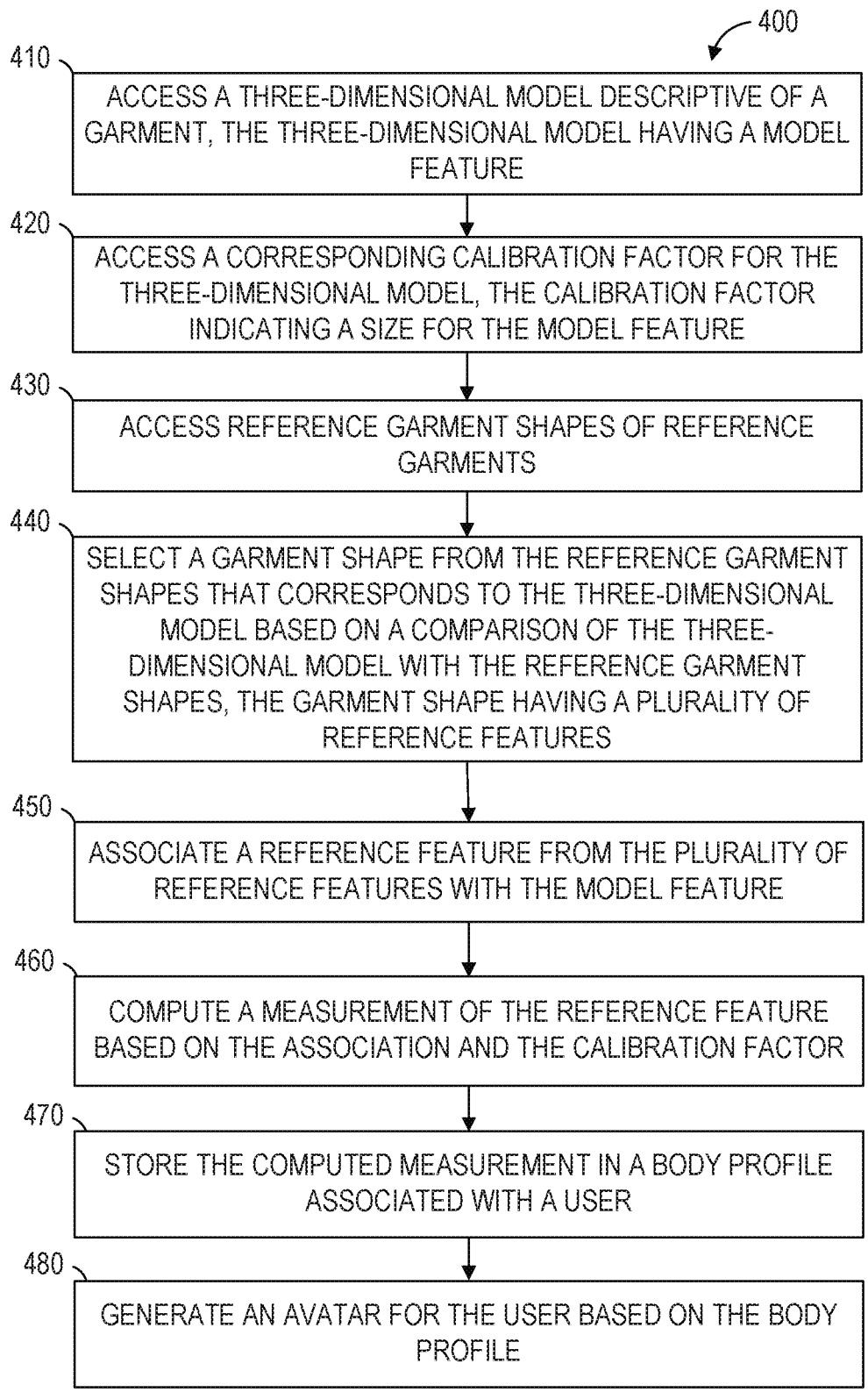
FIG. 4 is a flow diagram of a process for determining measurement information, in accordance with certain example embodiments.

FIG. 2 further describes the memory 236 in the server 202, as initially described in FIG. 1. FIG. 2 includes an expanded depiction of the file system 242. The file system 242 may store one or more of the following files: garment model files 251; extracted geometry files 252; extracted texture files 253; stitching information files 254; a garment template database 255; draping parameters files 256; simulation parameters files 257; and simulation result geometry files 258. FIG. 4 further describes operations using the files from FIG. 2.

Figure 3:
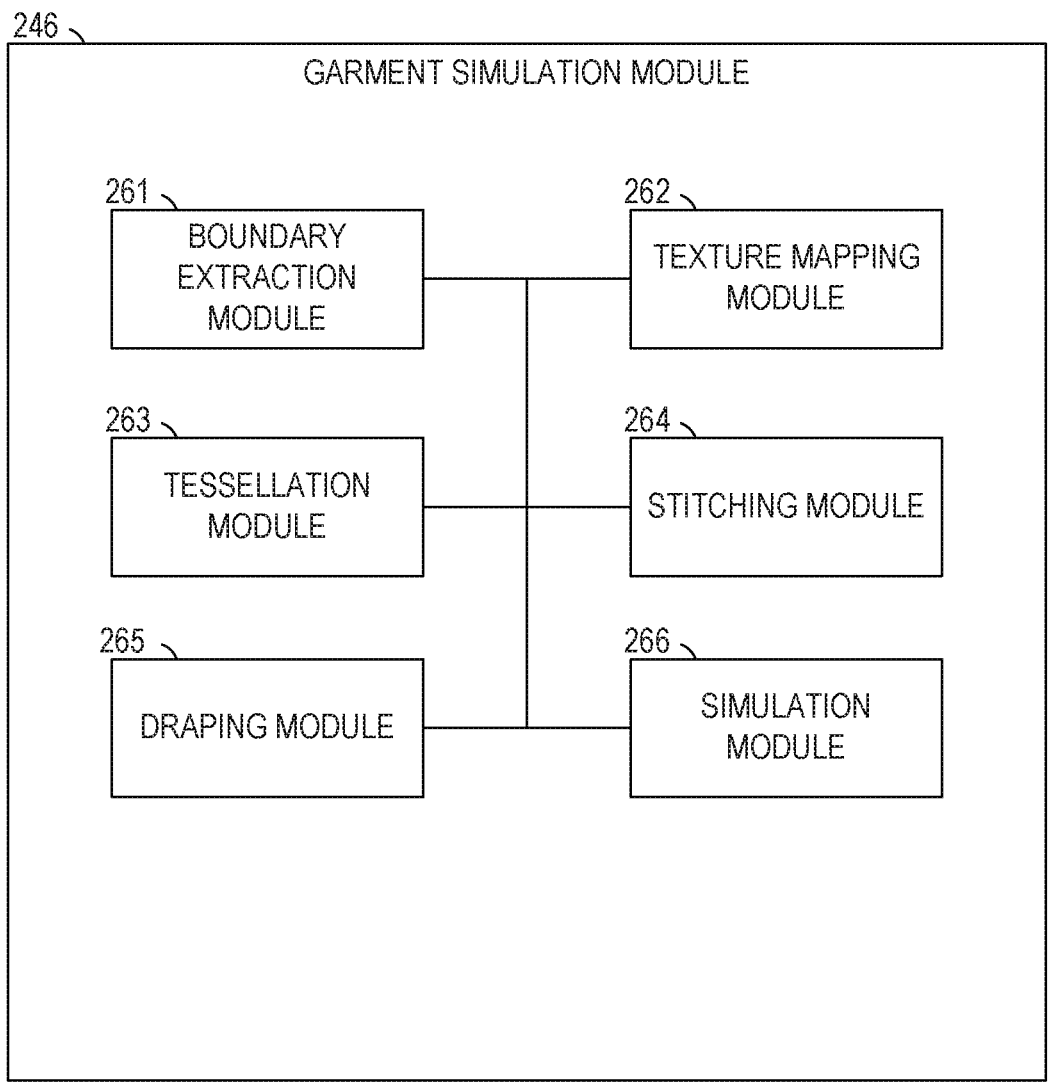
FIG. 3 is a block diagram illustrating an example simulation module, in accordance with certain example embodiments.

FIG. 3 is a block diagram illustrating components of the garment simulation module 246, according to some example embodiments, as initially described in FIG. 1. The garment simulation module 246 is shown as including a boundary extraction module 261; a texture mapping module 262; a tessellation module 263; a stitching module 264; a draping module 265; and a simulation module 266, all configured to communicate with each other (e.g., via a bus 230, shared memory, or a switch). FIG. 4 further describes operations using the modules from FIG. 3. Additionally, U.S. Non-Provisional application Ser. No. 14/270,244 2014, filed May 5, 2014, titled "3-D DIGITAL MEDIA CONTENT CREATION FROM PLANAR GARMENT IMAGES," which is incorporated herein by reference, further describes the files (stitching information files 254) from FIG. 2 and the modules (e.g., boundary extraction module 261) from FIG. 3.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Each of the above identified elements may be stored in one or more of the previously mentioned memory devices, and corresponds to a set of instructions for performing a function described above. The above identified modules or programs (e.g., sets of instructions) need not be implemented as separate software programs, procedures, or modules, and thus various subsets of these modules may be combined or otherwise rearranged in various example embodiments. In some example embodiments, the memory 236 may store a subset of the modules and data structures identified above. Furthermore, the memory 236 may store additional modules and data structures not described above.

The actual number of servers used to implement the garment simulation module 246 and how features are allocated among them will vary from one implementation to another, and may depend in part on the amount of data traffic that the network environment 100 handles during peak usage periods as well as during average usage periods.

FIG. 4 is a flowchart representing a method 400 for extracting body dimensions (e.g., body parameters, dimensions and shape) of a user, according to example embodiments. The method 400 is governed by instructions stored in a computer-readable storage medium and that are executed by one or more processors of one or more servers 202. Each of the operations shown in FIG. 4 may correspond to instructions stored in a computer memory 236 or computer-readable storage medium.

Operations in the method 400 may be performed by the server 202, using modules described above with respect to FIGS. 1-3. As shown in FIG. 4, the method 400 includes operations 410, 420, 430, 440, 450, 460, 470 and 480. In certain example embodiments, the method 400 includes an operation for determining the size of the garment and an operation for applying a fit map to the garment.

In operation 410, the access module 244 can access a 3-D model descriptive of a garment. The 3-D model can be received from a database (e.g., mass storage 214) using the communications interface 220 via the network 34. The accessed 3-D model of a garment can be stored in the garment model files 251.

Additionally, the 3-D model can have one or more model features. Model features refer to characteristics that are distinctive to the specific garment. For example, when the garment is a pair of jeans, the features can include a waistband, a high hip (e.g., 3" down from top of waistband), a low hip (e.g., 6" down from top of waistband), a thigh measurement (e.g., circumference), a knee measurement, an inseam length, a fit (e.g., slim, normal, loose), and a cut (boot cut, relaxed, skinny, taper, straight). The list of model features is just representative, and is not intended to be exhaustive. Similarly, in some instances, the list can include a subset of the parameters listed. Furthermore, the body model, including the body measurements, can be derived from favorite garment pictures or measurements or information like brand and size. Moreover, body information can come in the form of past purchases and feedback (e.g., right size, loose, tight, good fit).

In operation 420, the access module 244 can access a corresponding calibration factor for the 3-D model. The calibration factor can be received from the garment model files 251 using the communications interface 220 via the network 34. The calibration factor is a numerical value that can indicate a size for the model feature. For example, the garment model files 251 can be based on one or more photographs of the garment. In at least one of the photographs, an object with known dimensions (e.g., credit card) can be depicted along with the garment by a user. The calibration factor can be generated, calculated, or derived based on the object with known dimensions.

Additionally, the calibration factor can be different for different zones for the garment, so might not be uniform. In some instances, the different calibration factor can follow from the grading rules of the brand or manufacturer. For example, the inseam can be kept constant, while the waist and the hips are increase by some factors.

In operation 430, the access module 244 can access reference garment shapes of reference garments. In some instances, the garment template database 255 can store reference garments of different types of garments (e.g., shirts, pants, dresses, coats). The access module 244 can receive the reference garments from the garment template database 255 using the communication interface 220 via the network 34. Each reference garment can have multiple garment shapes. For example, a reference dress can have a garment shape for the front of the dress, the side of the dress, the top of the dress, and the back of the dress. Additionally, the reference dress can represent a certain style (e.g., pleated, formal, cocktail), and each dress style can have different garment shapes.

In operation 440, the garment simulation module 246 can select a garment shape from the reference garment shapes that corresponds to the 3-D model based on a comparison of the 3-D model with the reference garment shapes. For example, a user can upload a photograph of a pair of jeans. A 3-D model of the jeans can be generated by the garment simulation module 246 based on the uploaded photograph. The 3-D model of the jeans can be accessed in operation 410. The 3-D model of the jeans can be compared with the reference garment shapes in operation 440. Then, the garment simulation module 246 can determine that the 3-D model of the jeans is the shape of a pair of jeans based on the comparison with the reference garment shapes. Based on the determination, the garment simulation module 246 can select the garment shape corresponding to a pair of jeans from the reference garment shapes. The garment simulation module 246 can configure at least one processor among the one or more processors (e.g., the CPU 222) to determine and select the correct garment shape from the reference garment shapes.

Additionally, the garment shape can have one or more reference features. As previously mentioned when discussing model features in operation 410, when the garment is a pair of jeans, the features (e.g., reference feature, or model feature) can include a waistband, high hip (e.g., 3" down from top of waistband), low hip (e.g., 6" down from top of waistband), thigh, knee, an inseam length, a fit (e.g., slim, normal, loose), and a cut (boot cut, relaxed, skinny, taper, straight).

In operation 450, the garment simulation module 246 can associate (e.g., map or assign) a reference feature from the plurality of reference features with the model feature. As previously mentioned, the 3-D model accessed in operation 410 has one or more model features. Once the garment shape is selected in operation 440, the reference features are compared, by the garment simulation module 246, with the model feature in order to associate a reference feature with the model feature. For example, if the model feature of 3-D model is a waist size, then the reference feature associated with the model feature is also a waist size of the garment shape. The garment simulation module 246 can configure at least one processor among the one or more processors (e.g., the CPU 222) to associate a reference feature with the model feature.

In operation 460, the garment simulation module 246 can compute a measurement of the reference feature based on the association from operation 450 and the accessed calibration factor from operation 420. The calibration factor can indicate a size for the model feature, and the model feature can be associated with a reference feature for the reference garment. For example, an object with known dimensions (e.g., credit card) can be used, by the garment simulation module 246, to determine that the size of the model feature (e.g., waistband) for the 3-D model (e.g., jeans) is a size 32. Based on the model feature's association with the reference feature, the garment simulation module 246 can compute that the waistband size of the reference feature for the reference garment is a size 32. The garment simulation module 246 can configure at least one processor among the one or more processors (e.g., the CPU 222) to compute the measurements.

Once the measurement are computed in operation 460, the network environment 100 can create a set of 3-D human-like body models (e.g., static, animated, dynamic) for a content stage (e.g., fashion performance, 360° view, fit map, suggest a size).

By using salient body parameters, garment simulation module 246 can create human-like body models to span the whole range of human bodies that can potentially wear a given garment. Salient body parameters can include, but not limited to bust, waist, hips, thigh, calf, and height for women. For example, the total number of human-like male bodies can be Nm, and the total number of human-like female bodies can be Nw. Continuing with the example, let $N_{bust}$=the number of unique bust values (sampled at some discrete interval say 1"); $N_{waist}$=the number of unique waist values; $N_{param}$=values of the body parameter, and so on. The total set of women's bodies Nw can be equal to $N_{bust}*N_{waist}*N_{param}$. Accordingly, the garment simulation module 246 can create human-like body models to span the whole subset of women's bodies that can fit the garment based on the relevant parameter values.

In operation 470, the computed measurement of the reference feature can be stored, by the garment simulation module 246, in a body profile associated with the user. One or more computed measurements can be stored in the body profile associated with the user. The body profile can be stored in the simulation parameters files 257. In some instances, the body profile can be stored on a cloud server for the user to retrieve using a mobile device. In some other instances, the body profile can be stored on a third-party server of a merchant that a user can access when browsing a virtual fitting room.

In operation 480, the garment simulation module 246 can generate an avatar (e.g., a 3-D avatar) for the user based on the body profile. Alternatively, the rendering module 248 can generate the avatar. For example, based on the computed measurement of the waistband being X" (e.g., 32"), an avatar with a waist size of X" can be generated where X is a body allowance to accommodate a comfortable fit. Additionally, when the body profiles include a plurality of computed measurements (e.g., waistband size, high hip, low hip, thigh, knee, an inseam length, a fit, a cut), the generated user avatar becomes a more accurate representation of the user.

In some instances, the rendering module 248 can generate an image of the 3-D model descriptive of the garment draped on the generated avatar based on one or more calculated simulated forces. The rendering module 248 can configure at least one processor among the one or more processors (e.g., the CPU 222) to generate the image using the draping module 265 and the simulation module 266. The 3-D model can be presented based on a simulated force. The presentation can be done by digitally draping the 3-D model onto the avatar. In various example embodiments, the rendering can involve taking data from all previous operations, combining the data, and inputting the data into a cloth simulation engine. Additionally, the simulation results can be stored in the simulation result geometry files 258.

Optionally, the display module 250 can present the generated avatar to a user. The display module 250 can present the generated image on a display of a device. The display module 250 can configure the user interface 232 for the presentation. The display module 250 can configure at least one processor among the one or more processors (e.g., the CPU 222) to present the generated image on the display of a mobile device.

Figure 5:
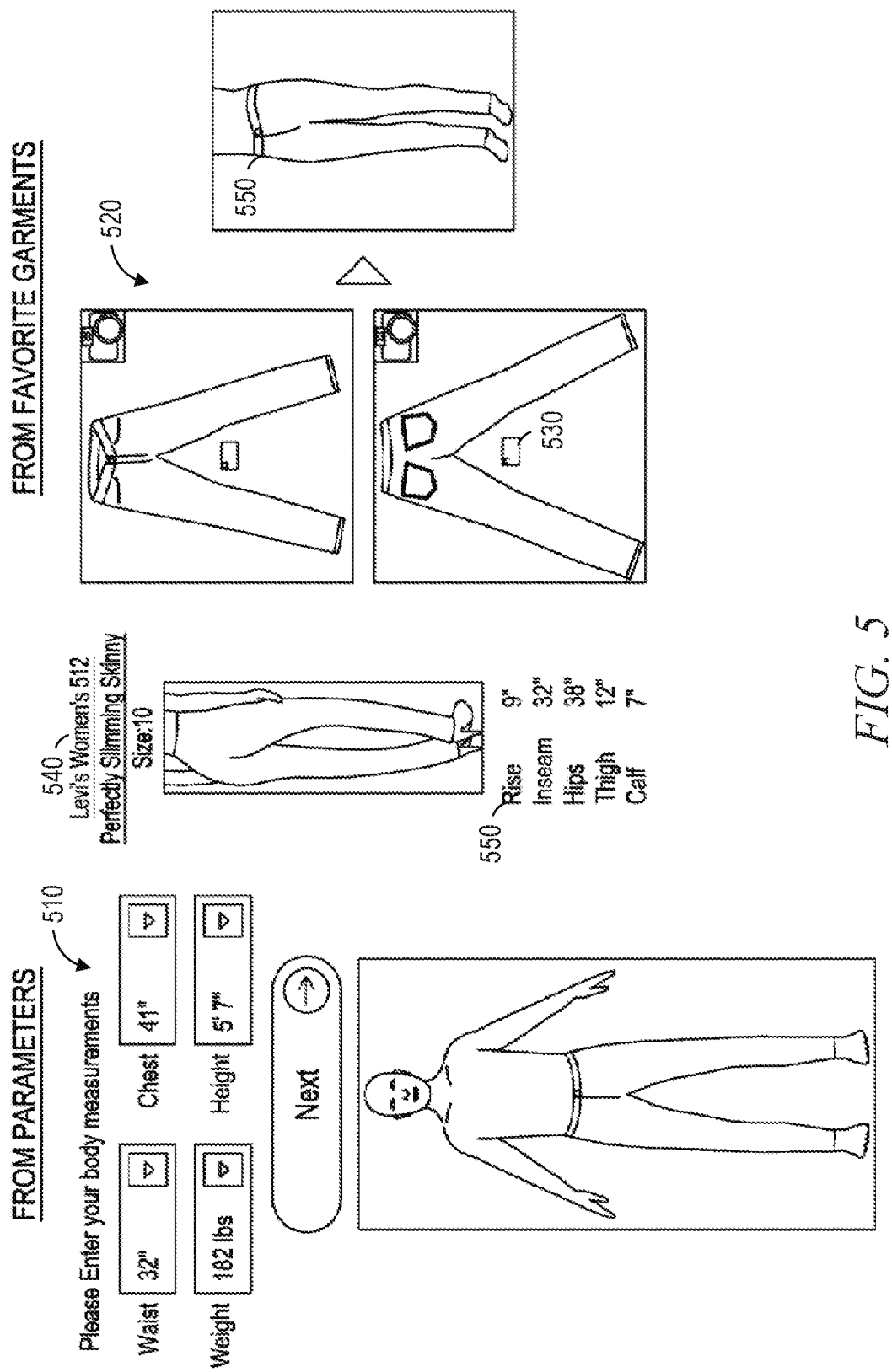
FIG. 5 illustrates a user interface for determining a user's size, in accordance with certain example embodiments.

Now referring to FIG. 5, the calibration factor accessed in operation 420 can be received, by the garment simulation module 246 or from the user. For example, when user input is in the form of a reference dimension(s) (e.g., user measures and provides information about the inseam length or waist length for example) or provides a reference size and related information which would capture dimensional information (such as SMALL from brand XYZ). The user can input parameters 510 (e.g., the model features) for the garment simulation module 246 to compute measurements. The input parameters 510 can include weight, height, chest, waist, and inseam.

In other instances, the body measurements of a user can be determined from photographs 520 of garments using a calibration object 530 (e.g., a credit card depicted in one or more of the photographs 520). The garment simulation module 246 can calibrate the calibration object 530 and the garment by assigning an x, y, z position value to each pixel. If the garment is laid out on a planar surface in a photograph 520, the garment simulation module 246 may need the relative position of three points on the garment to compute the calibration. Alternatively, the garment simulation module 246 can compute the calibration by using projection mapping from image to object space). For example, using the calibration object 530, the garment simulation module 246 can extract four corner points of the calibration object 530, and using the dimensions of the calibration object 530, the garment simulation module 246 has enough information to compute the calibration.

Similarly, with a grid paper as a calibration object (e.g., calibration object 530), the garment simulation module 246 can use the relative positions of three points on the grid paper to compute this calibration. Additionally, given a garment photograph and knowledge of what Size the garment is, the body model can be determined. Furthermore, the body model can be generated based on purchase history and feedback. Purchase history can be used by the garment simulation module 246 to determine the fit of a garment on the user. Feedback can include returns and acceptances of purchases. For example, when a garment is returned, the garment simulation module 246 can infer that the returned garment does not fit correctly (e.g., tight, loose).

Additionally, based on the input parameters 510 or the photographs 520, the garment simulation module 246 can compute measurements, create a body profile 540, and generate an avatar 550, as described in operations 460, 470 and 480. In the example illustrated in FIG. 5, the computed measurements 550 can be presented for the body profile 540 (e.g., rise measurement, inseam measurement, hips measurement, thigh measurement, calf measurement) associated with the avatar 550. The body profile 540 can include a recommended size. The recommended size can be based on the size that fits the avatar's dimensions the closest with minimum distortion to the garment. Additionally, a user avatar 550 can be presented with a recommended size of garment.

The garment simulation module 246 can be configured to determine a size from a set of sizes for the garment based on the calculated simulated forces or the generated fit map. For example, using a generated fit map, the garment simulation module 246 can determine the recommended size for a pair of jeans. Accordingly, the display module 250 can present a body profile 540 with a recommended size to the user, such as a size 10 for this example. Furthermore, the garment simulation module 246 can determine a recommended size based on the available garment sizes stored in the file system 242. For example, the garment simulation module 246 can determine the recommended size based on a database of reference garment shapes using the garment template database 255 and the stitching module 264.

Figure 6:
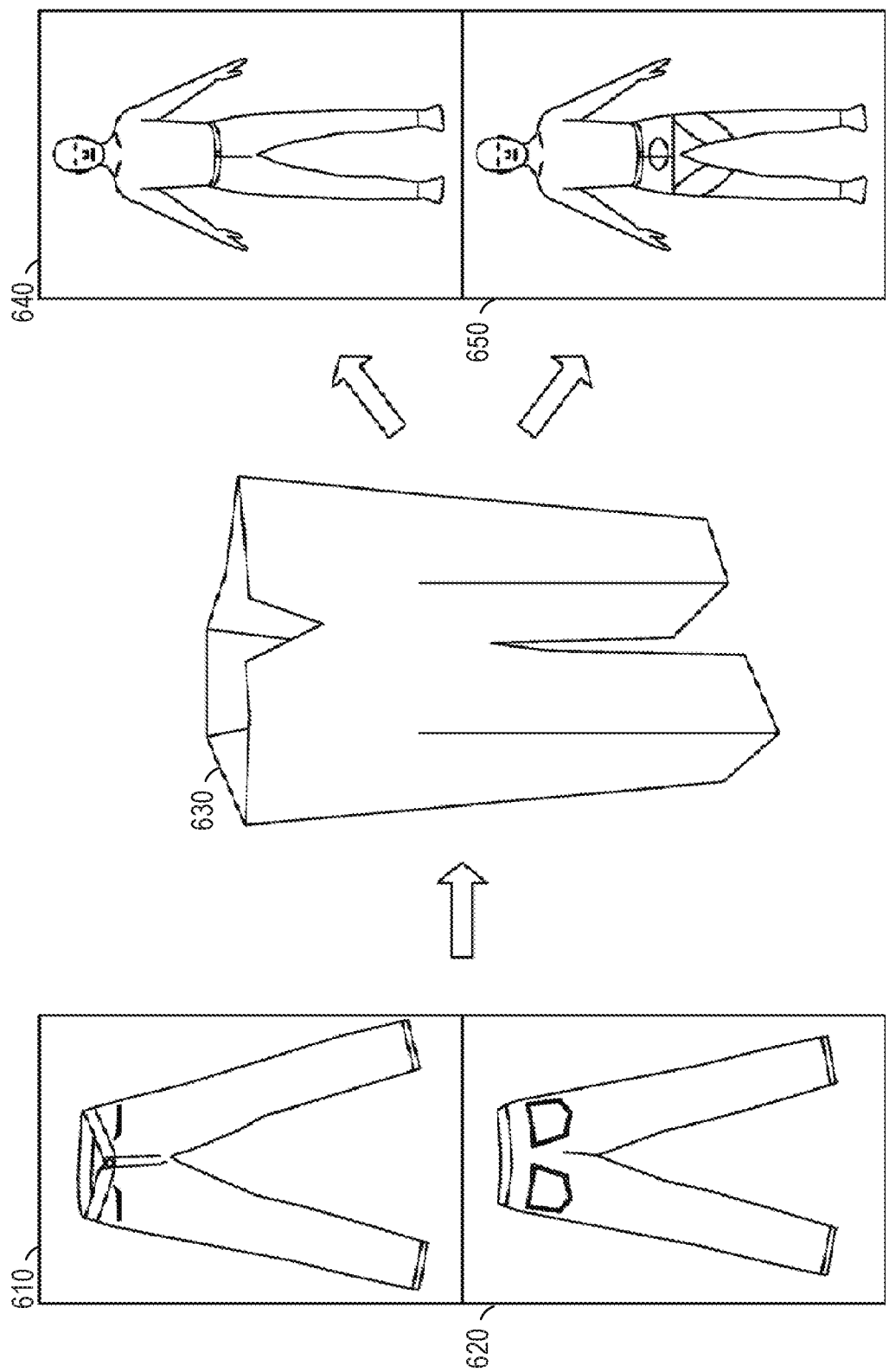
FIG. 6 illustrates a method for presenting digital jeans on a 3-D body model, in accordance with certain example embodiments.

Now referring to FIG. 6, using the two images, the garment simulation module 246 can generate a first partial shape 610 corresponding to the front of a pair of jeans and a second partial shape 620 corresponding to the back of the jeans. Then, the garment simulation module 246 can determine that the received images are images of a pair of jeans by comparing the generated partial shapes to the jeans garment template in the garment template database 255. Moreover, based on the determination that the garment is a pair of jeans, the digital garment creation module can join the partial shapes to generate a 3-D pair of digital jeans 630. As will be further described herein, the 3-D pair of digital jeans 630 can be tessellated.

Furthermore, the access module 244 can receive the 3-D model in operation 410 of FIG. 4. Moreover, the 3-D pair of digital jeans 630 can be presented on an avatar 640. The avatar 640 can have similar dimensions to the user who is interested in purchasing the jeans 630. Optionally, a fit map 650 indicating the tightness or looseness of the jeans 630 on the avatar 640 can be presented to the user.

Additionally, the 3-D model accessed in operation 410 can be a tessellated 3-D garment model. The tessellated 3-D garment model can include a group of vertices associated with points on the surface of the garment. The garment points can be generated using a tessellation technique by the tessellation module 263. The tessellated geometric shapes can be stored in the extracted geometry files 252. For example, a shirt can be tessellated with triangles (e.g., about 20,000 triangles when a triangle edge is around 1 centimeter), and the vertices of the triangles can be the garment points of the 3-D garment model. The garment points can include location information such as an x, y, and z position value.

The garment simulation module 246 can position at least a portion of the generated avatar 640 inside the garment points. In some instances, positioning can include placing the garment on or around an avatar 640, given that the avatar 640 may be fixed in some embodiments. In these instances, the garment can be stretched and deformed based on the simulation. The garment simulation module 246 can configure at least one processor among the one or more processors (e.g., the CPU 222) to position the avatar 640 inside the garment model.

As previously mentioned, the garment model can consist of a set of shapes (e.g., triangles) to form the surface of the garment. The shapes can be created using lines connecting the vertices. Additionally the garment model can include physical properties associated with the lines (e.g., edges) and vertices in the mesh.

The garment simulation module 246 can simulate the garment model on the generated user avatar 640. In some instances, simulation of the garment can include placing the garment around the body at an appropriate position, and running simulations. The simulation can advance the position and other related variables of the vertices of the garment based on different criteria (e.g., the laws of physics, garment material properties, body-garment interaction). The result is a large system of equations (e.g., one variable for each force component) that the garment simulation module 246 can solve in an iterative fashion. The simulation can be completed when the simulation becomes stable. For example, the simulation can become stable when the garment reaches a steady state with a net force of zero.

In some example embodiments, the simulated force can include a gravitational force, an elastic force, a friction force, or an aerodynamic force. Additionally, the garment simulation module 246 can further calculate the simulated forces acting on the subset of the garment points based on a material properties of the garment. For example, the simulated forces can include a gravitational force and an elastic force, and the material properties of the garment indicate a degree to which the garment is elastic. The material properties of the garment can include, but are not limited to, a sheerness value, a linear stiffness value, and a bending stiffness value.

Figure 7:
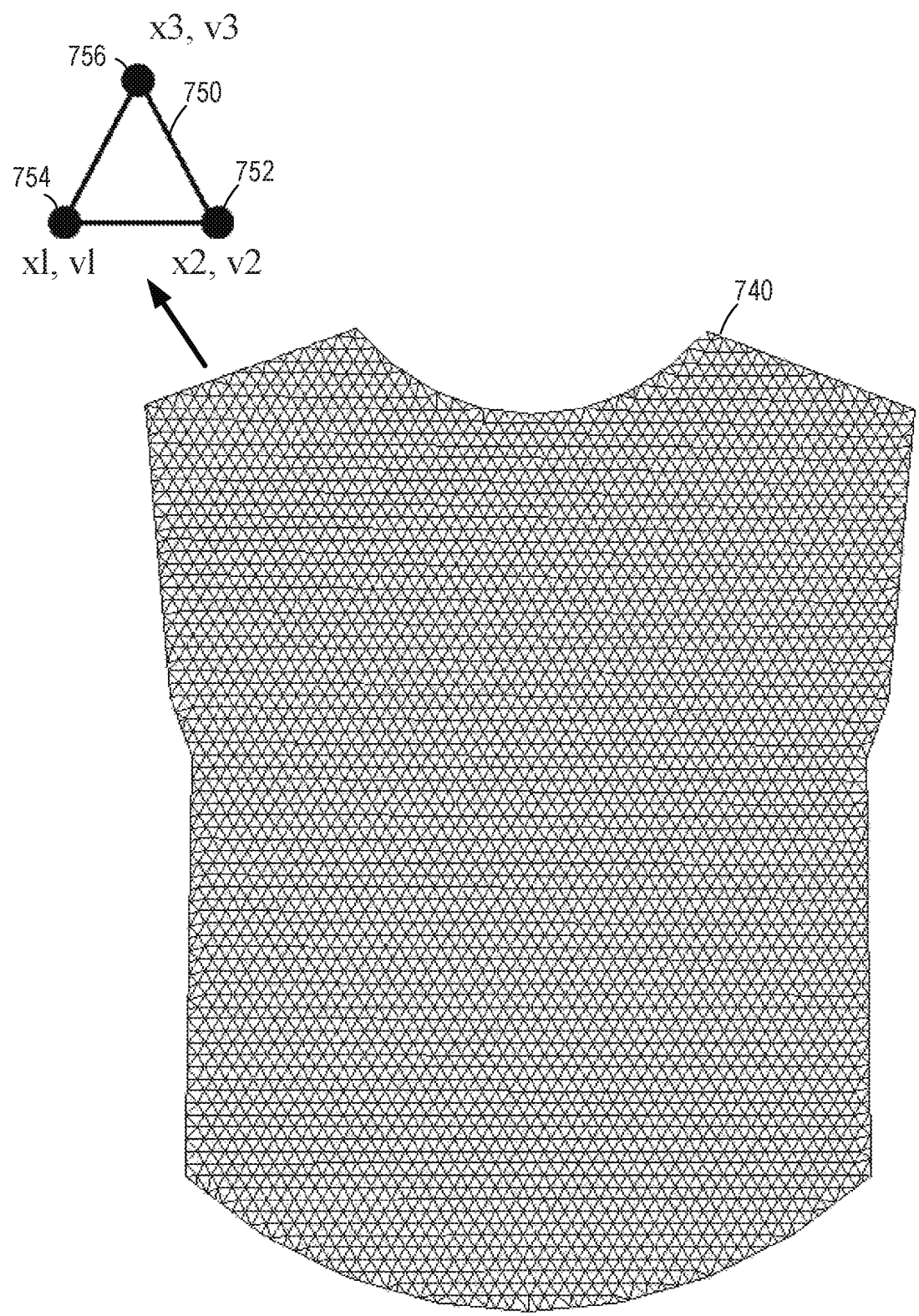
FIG. 7 illustrates a sample triangle associated with a tessellated garment, in accordance with certain example embodiments.

The simulations can be implemented through specific modules (e.g., the simulation module 266) stored in the memory 236. Some examples of implementations and equations are described below. For example, below is the system of equations to be used for a three-spring implementation of a sample triangle 750 with three vertices (i.e., a vertex 752, a vertex 754, a vertex 756) associated with a tessellated garment 740, as illustrated in FIG. 7.

$$spring_{force_1} = \left(\frac{k_s}{restlength_1}\right) * (|x_2 - x_1| - restlength_1) * spring_{direction_1} + \left(\frac{k_d}{restlength_1}\right) * Dot_{Product}(v_2 - v_1, spring_{direction_1}) * spring_{direction_1} \quad \text{(Equation 1)}$$

$$spring_{force_2} = \left(\frac{k_s}{restlength_2}\right) * (|x_3 - x_2| - restlength_2) * spring_{direction_2} + \left(\frac{k_d}{restlength_2}\right) * Dot_{Product}(v_3 - v_2, spring_{direction_2}) * spring_{direction_2} \quad \text{(Equation 2)}$$

$$spring_{force_3} = \left(\frac{k_s}{restlength_3}\right) * (|x_1 - x_3| - restlength_3) * spring_{direction_3} + \left(\frac{k_d}{restlength_3}\right) * Dot_{Product}(v_1 - v_3, spring_{direction_3}) * spring_{direction_3} \quad \text{(Equation 3)}$$

Where $k_s$ is the elastic spring constant, $k_d$ is the damping spring constant, and each vertex has a position (x) and velocity (v).

In the equations above, when the denominator is a restlength value, a non-zero value can be used for zero-length springs. Additionally, the equations can use a visual restlength value when the denominator is not the restlength value, which in zero-length spring cases is 0. This allows for the system to handle zero-length springs without dividing by 0.

To further explain the equations above, a walkthrough of the equations is described. The simulation module 246 can maintain is the positions and velocities of all the points that represent the garment. In future iterations, the simulator can update the positions of the points over time by computing the net force on each point at each instance in time. Then, based on the mass of the particle, the simulation module 266 can use the equation based on the laws of motion, F=ma, to calculate an acceleration. The acceleration determines a change in velocity, which can be used to update the velocity of each point. Likewise, the velocity determines a change in position, which can be used to update the positions. Therefore, at each point in the simulation, the simulator can compute the net force on each particle. The forces exerted on each particle can be based on a gravitational force, spring forces, or other forces (e.g., drag forces to achieve desired styling). The equation for gravitational force is F=mg, and the spring force is described above.

The spring force F has two components, an elastic component (e.g., the part of the equation multiplied by $k_s$) and a damping component (e.g., the part of the equation multiplied by $k_d$). The elastic component is related to the oscillation of the spring. The strength of the elastic force is proportional to the amount the spring is stretched from the restlength value, which can be determined by $x_2-x_1$ (e.g., the current length of the spring) minus the restlength value. For example, the more the spring is compressed or stretched, the higher the force pushing the spring to return to its rest state. Additionally, $k_s$ is a spring constant that allows for scaling up/down the force based on the strength of the spring, which is then multiplied by the spring direction to give the force a direction (e.g., in the direction of the spring).

The damping component calculates the damping effect (e.g., heat being generated by the spring moving, drag). Damping can be drag force, where the higher the velocity, the higher the drag force. Accordingly, damping can be proportional to velocity. In the case of a spring, there can be two particles moving, so instead of a single velocity the simulator computes a relative velocity between the two endpoints (e.g., $v_2-v_1$ in FIG. 6). For example, the larger the relative velocity, the faster the points are moving apart or coming close together, and as a result the larger the damping force (e.g., the damping is proportional to relative velocity). Additionally, $k_d$ is the damping spring constant to scale the damping force either up or down, which can be multiplied by the spring direction to give the force a direction.

In various example embodiments, an individual simulation can be run for each of the Nm or Nw bodies. The resultant output can be stored or displayed to a user. In some instances, for each of the bodies, the garment simulation module 246 can capture the position of the vertices at the end of the simulation, and store the information in a database. For a mesh with K vertices, a total of 3K numbers are stored (the x, y, and z positions for each vertex). These constitute the look of the given garment on any given body.

In various example embodiments, at the steady state of each simulation, the garment simulation module 246 can also compute the forces being exerted in the springs (e.g., edges) of the mesh. For example, for an edge between two vertices (e.g., $V_1$ and $V_2$), the resultant force on $V_1$ (and correspondingly $V_2$) equals:

$$F(V_1)=k(V_1,V_2)*\text{Delta}(V_1-V_2), \text{ where} \quad \text{(Equation 4)}$$

$k(V_1, V_2)$ is the spring constant of the spring joining $V_1$ and $V_2$ (e.g., a function of the material property of the garment); and Delta($V_1-V_2$) is a velocity-dependent force function based on the change in position vectors for $V_1$, $V_2$ as compared to their original rest state. These forces can then be accumulated for each vertex to compute the resultant force.

Figure 8:
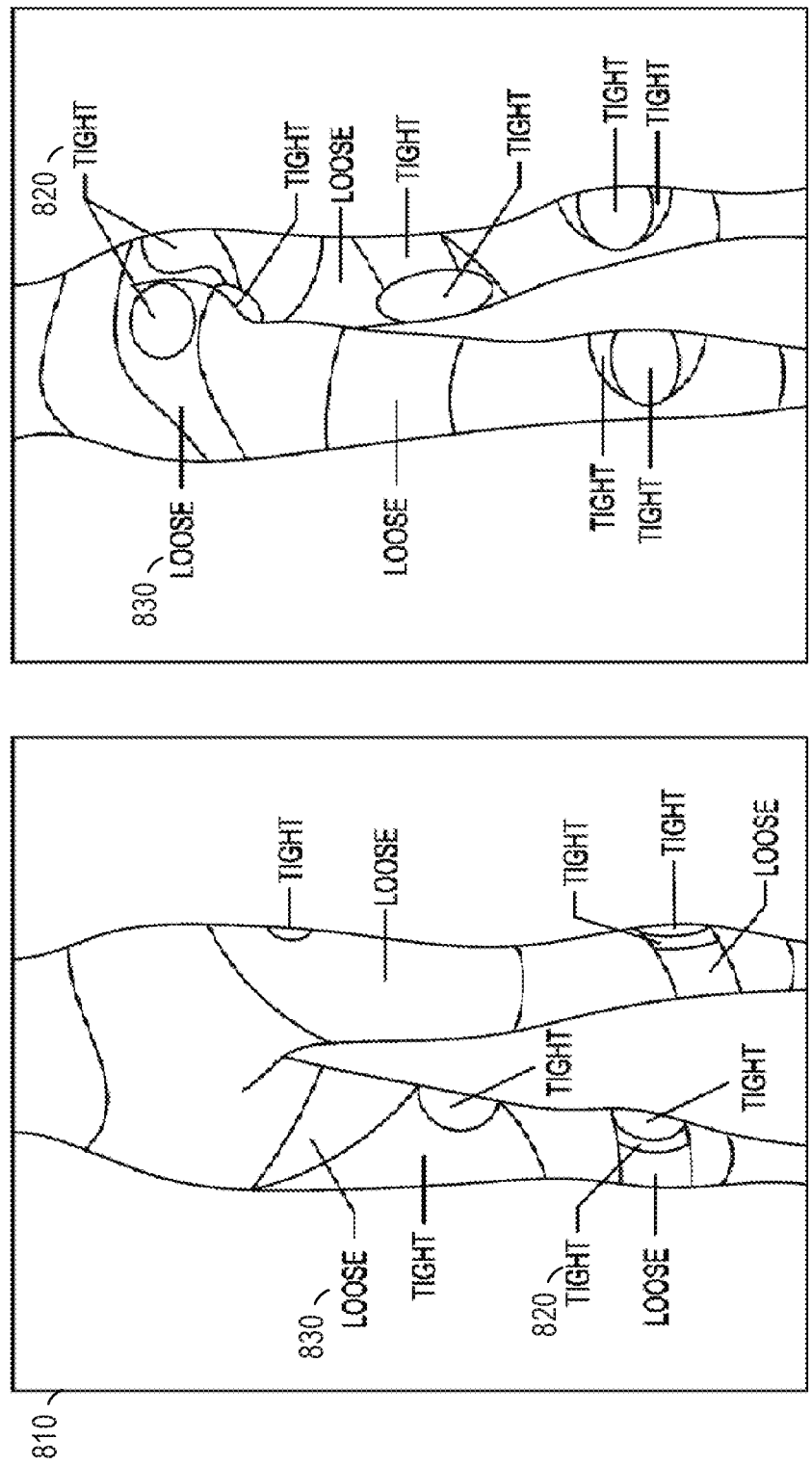
FIG. 8 illustrates an example of a fit map, in accordance with certain example embodiments.
Figure 9:
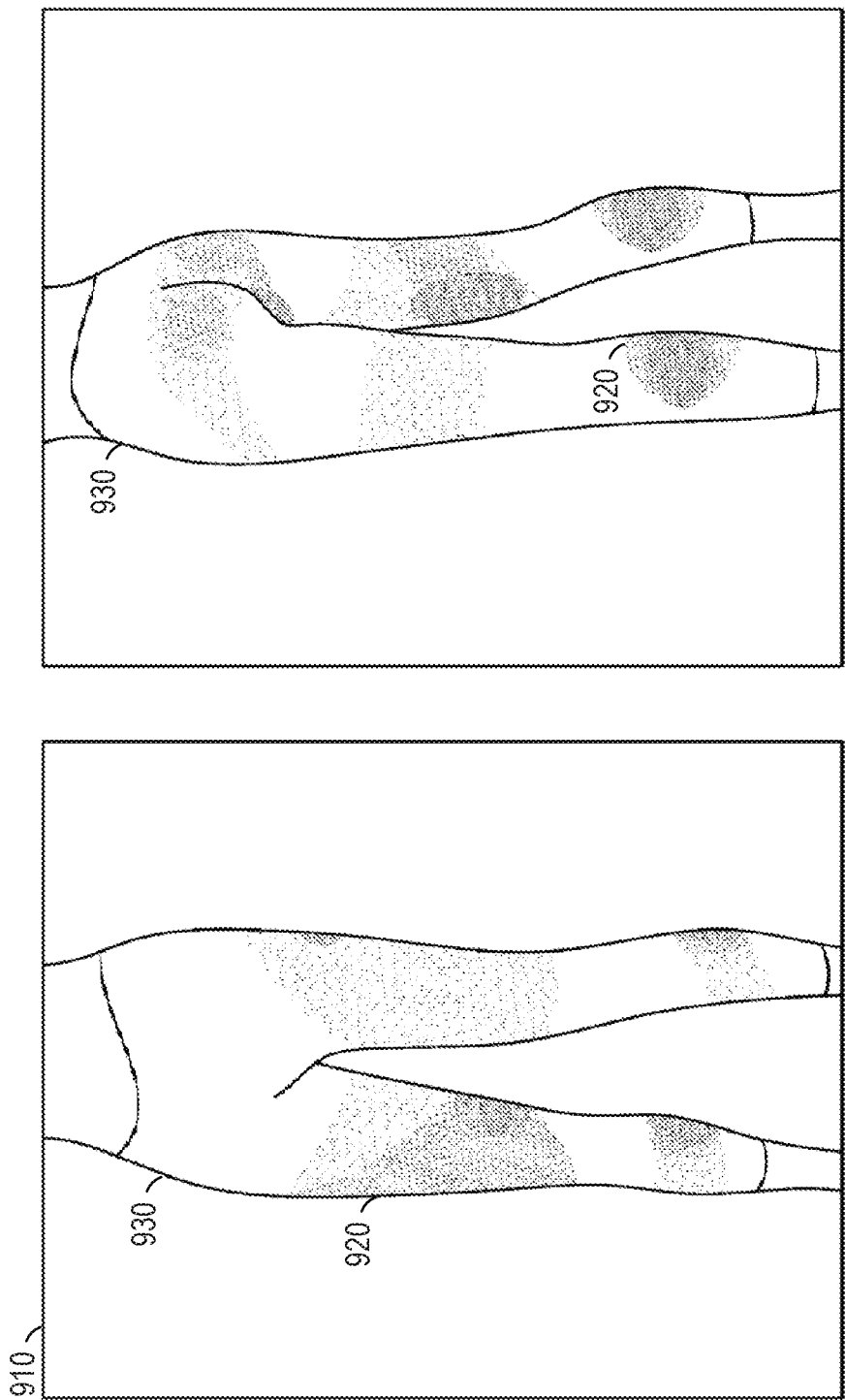
FIG. 9 illustrates another example of a fit map, in accordance with certain example embodiments.

In various example embodiments, for each of the bodies, the garment simulation module 246 can store the resultant force on each vertex in the simulation result geometry files 258. The resultant force on each vertex can serve as a measure of the tightness (e.g., for large force magnitude) or looseness in different regions of the garment. The resultant force computed can be interpreted as a stress, pressure, or compression on the garment. Additionally, the resultant force can be a representation of a force felt by the body at the corresponding point or region. As later described, FIGS. 8-9 illustrate the resultant forces in a fit map 650. For example, the tight regions can be depicted using warm colors, and the loose regions depicted using cool colors.

Techniques for displaying a fit map 650 on a garment for the same static position are provided, in accordance with example embodiments. The fit map 650 can illustrate tension forces, inferred force, or pressure on the body. The fit map 650 can show and convey regions of the garment that can be tight or loose on a user. This additional information can aid the user in making an informed purchase decision without physically trying on the garment.

As illustrated by FIG. 8, the garment model can be draped on the body model. According to some example embodiments, the method 400 can further include operations where the garment simulation module 246 is configured to generate a fit map 650 based on the calculated simulated forces, and the display module 250 can present the generated avatar 640 in operation 480 with a generated fit map 810 as illustrated in FIG. 8.

According to another arrangement of the fit map 810, a fit map 810 can show display cues. For example, a set of output forces can be chosen. Each output force can correspond to a range of forces (e.g., tight, loose) that can be displayed to the user. Additionally, style information can be presented based on the force. For example, loose or tight clothing may convey some style information. FIG. 8 shows an example of a fit map 810 with color display cues. As illustrated in FIG. 8, the display cues can be overlaid, by the simulation module 266, on the rendered garment itself. As illustrated, the generated fit map 810 can be based on a magnitude of the calculated simulated forces. For example, when the magnitude of the calculated simulated forces is high, the fit map 810 can label that section of the garment as a tight section 820. Alternatively, a loose section 830 occurs when the magnitude of the calculated simulated forces is low.

Furthermore, the fit map 810 can convey derivative information such as the relative differences or similarities in force, style, and fit between two garments. For example, a user can use the derivative information from the fit map 810 to select between the two sizes, styles, or find an equivalent size or style to a given garment. In some instances, the derivative information can be presented using colors or cues.

As illustrated in FIG. 9, a fit map 910 can be generated by assigning a color to a garment point (e.g., a vertex in the tessellated garment model). The color values can be determined based on the calculated simulated force. Each color corresponds to a range of forces. For each vertex, the corresponding color can be computed and stored. The color information can be rendered from revolving viewpoints around the body to compute a color-coded tension map.

For example, in the fit map 910, each vertex of the shape (e.g., triangle) is assigned a red-green-blue (RGB) value. In some instances, the generated fit map 910 can be colored based on a magnitude of the calculated simulated forces. For example, sections of the garment that are tight around the body of a user can be colored red 920, while loose sections of the garment can be colored blue 930. Thus, in the triangulation method, each triangle potentially has three different RGB values. The rest of the points of the triangle can then be interpolated. Interpolation allows for the RGB values of the remaining points in the triangle to be filled in using a linear combination method (e.g., the points of the triangle are weighted based on the distance to the three vertices and the RGB values are assigned accordingly).

In various example embodiments, for both of the above arrangements, the output is stored as a series of images. Both the resolution and number of images can be set dynamically. Additionally, the output can include other use cases, such as videos, 3-D objects, text description of the simulation output, or recommendation on which a size to purchase.

In certain example embodiments, texture and optical properties can be determined, by the garment simulation module 246, from the information accessed in operation 410 and stored in the extracted texture files 253. The texture information can be used to determine, by the garment simulation module 246, the material properties of the garment and can be used, by the garment simulation module 246, to generate the fit map. The material properties of the garment can be used, by the garment simulation module 246, for calculating the simulated forces on the generated avatar. Furthermore, the material properties can be matched, by the garment simulation module 246, to the garment template database 255 in order to determine the type of garment using the texture mapping module 262.

According to another embodiment, the rendering module 248 can be configured to distort the 3-D garment model, and the display module 250 can present the distorted 3-D garment model. For example, the distorted 3-D model can be presented using the display module 250. The rendering module 248 can distort the 3-D garment model by stretching or twisting the 3-D garment model. Distorting the digital garment model can generate 3-D models that are representative of the family of sizes of a garment typically carried and sold by retailers.

Figure 10:
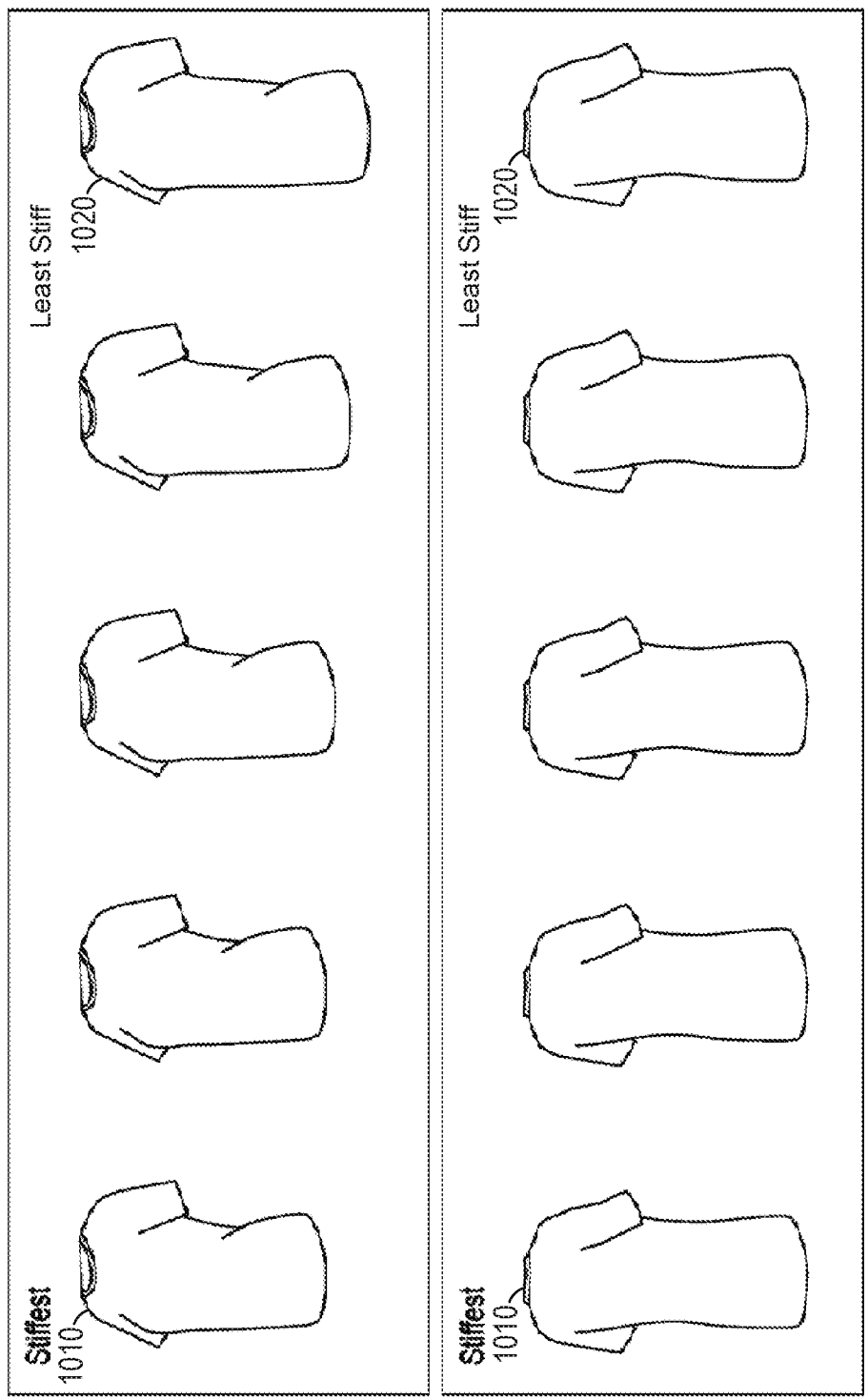
FIG. 10 illustrates an example of distorting the 3-D digital garment model in accordance with certain example embodiments.

Additionally, as illustrated in FIG. 10, distorting the 3-D model can generate a specific sized version of the garment. The distortion of the 3-D digital garment model can be uniform for the entire model (i.e., the entire model is grown or shrunk), or specific to individual zones (e.g., specific garment areas) with different distortions (e.g., scale factors) for the individual zones. Furthermore, the scaling of dimensions of the garments can be arbitrary (as in the case of creating a custom size), or can be determined according to specifications provided by a garment manufacturer. The specifications can be based on grading rules, size charts, actual measurements, material properties, or digital measurements. In the example illustrated in FIG. 10, the garment is distorted based on the stiffness of the shirt, where the leftmost shirt 1010 is the stiffest and the rightmost shirt 1020 has the least amount of stiffness.

Moreover, the precision of the fit map can be adjusted to accommodate varying levels of desired accuracy of the garment model and can be based on computation power. The precision can be automatically adjusted by the network environment 100 based on the client device (e.g., lower precision for a mobile device, higher precision for a large screen display). In some instances, the standard error of tolerance is a parameter that can be set. Tolerance can be measured by actual units of distance (e.g., 0.01 inches). Alternatively, tolerance can be measured in numbers of pixels.

Furthermore, the material properties can be matched, by the garment simulation module 246, to the garment template database 255 in order to determine the type of garment using the texture mapping module 262. For example, the garment simulation module 246 can identify pleats in a garment based on the information accessed in operation 410. Additionally, the material property can be extracted even if the images of the garment are stretched or sheared.

In some instances, the draping parameters files 256 can be extracted from the garment template database 255 by the garment simulation module 246. Similarly, the simulation parameters files 257 can also be extracted from the garment template database 255.

Techniques for suggesting a recommended size from the given set of sizes for a garment are provided, in accordance with example embodiments. As previously mentioned, distorting techniques can be used for recommending a size. For example, tops are usually distributed in a few generic sizes (e.g., XS, S, M, L, XL, XXL). By computing the tension map for each size for the user's avatar, a recommended size can be suggested, by the garment simulation module 246, as illustrated by the body profile 540 in FIG. 5. The recommended size can be based on the size that fits the avatar's dimensions the closest with minimum distortion to the garment, or the recommendation could be based on the garment fit guidance from a manufacturer, designer or stylist.

Figure 11:
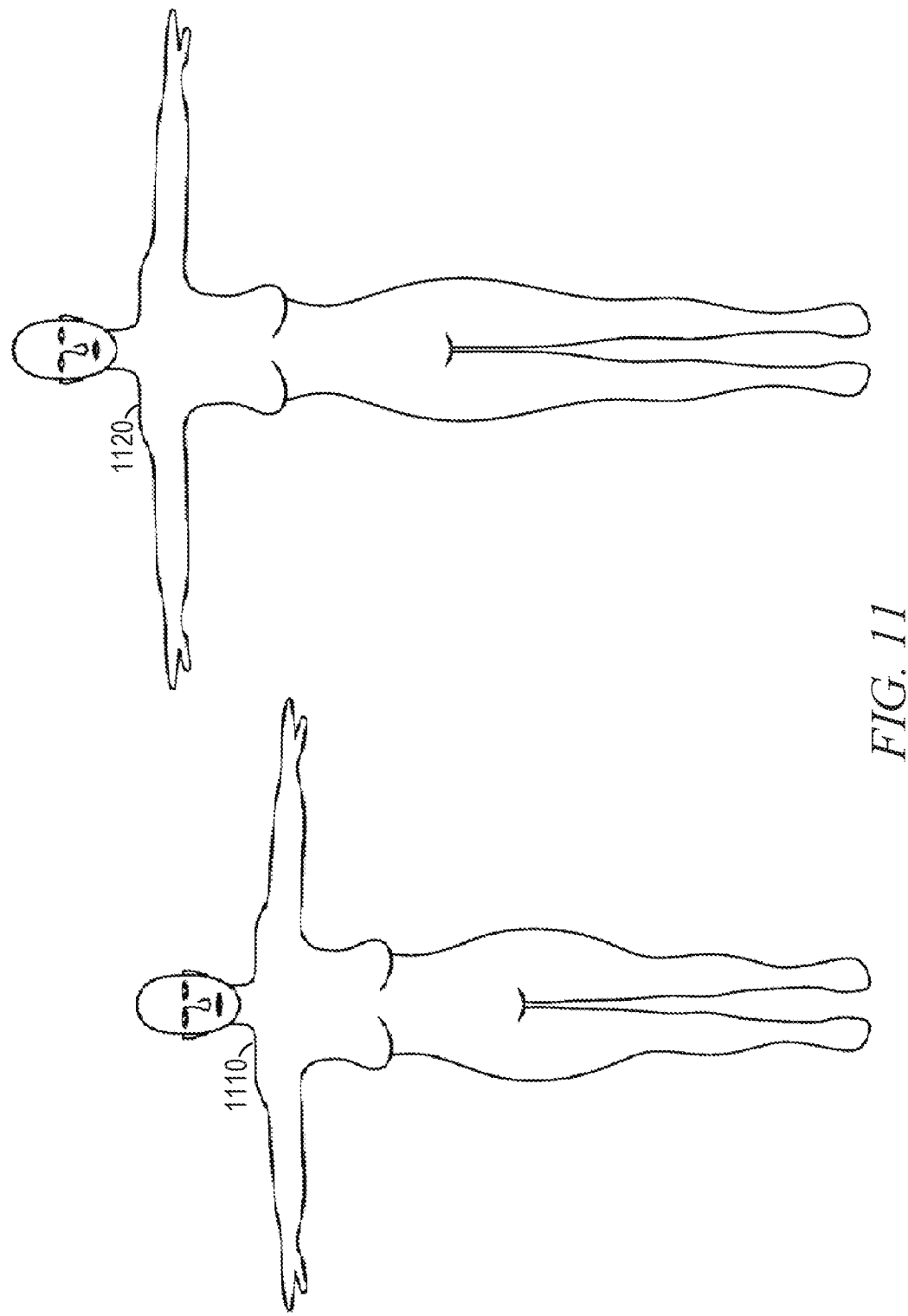
FIG. 11 illustrates different body models based on the body parameters, in accordance with certain example embodiments.

As previously mentioned, based on the computed measurements from operation 460, the garment simulation module 246 can generate different avatars as illustrated in FIG. 11. Since different users have different dimensions, the avatars (e.g., left avatar 1110, right avatar 1120) can be specifically tailored to the user in order to accurately show how an article of clothing fits.

In addition to suggesting a recommended size, techniques for incorporating a user's fitting preferences (e.g., loose around the waist) are also described. Algorithms to compute a personalized size recommendation for the user can further be developed based on a user's buying and return pattern. In some instances, the personalized size recommendation can be based on dividing the body into zones and having a list of acceptable sizes for each zone. Furthermore, fit and size recommendation can be based on specific information about the class or type of garment. For example, given that yoga pants have a tight fit, when the class of garment is determined to be yoga pants, the garment simulation module 246 can infer that the garment has a tight fit based on parameters obtained from the manufacturer or a lookup table. Similarly, the garment simulation module 246 can infer that flare jeans have a loose fit at the bottom of the jeans.

For example, the body can be divided into zones. For a woman, the zones can include shoulders, bust, waist, hips, thighs, calves, and so on. For a given size of a garment of a certain category (e.g., jeans), the technique can determine if the garment fits based on the user's buying and return pattern. When the garment fits, the dimensions of the garment in each applicable zone can be added to a list of acceptable dimensions for the user. When the garment fits, the algorithm used by the garment simulation module 246 may assume that all the dimensions fit the user. Alternatively, when the garment does not fit (e.g., the user returns the garment), the dimensions of the garment in each applicable zone are added to a list of unacceptable dimensions, stored in a database, by the garment simulation module 246. Similarly, when the garment does not fit, the algorithm may assume that at least one of the dimensions did not fit the user.

A classifier (e.g., sequential minimization optimization (SMO)) for each garment category implemented by the garment simulation module 246 based on the dimensions that either fit or do not fit the user. For a given new garment in a specific category, the garment simulation module 246 can predict the correct size based on the classifier and recommend the size to the user. Based on feedback (e.g., the user's buying and return pattern), the user's preference and the classifiers can be updated by the garment simulation module 246. In some instances, five to ten garments for a given category can help achieve over 90% accuracy on the correct user size. Accordingly, the number of garments to train and converge on user's preferences can be low (e.g., less than 10).

Figure 12:
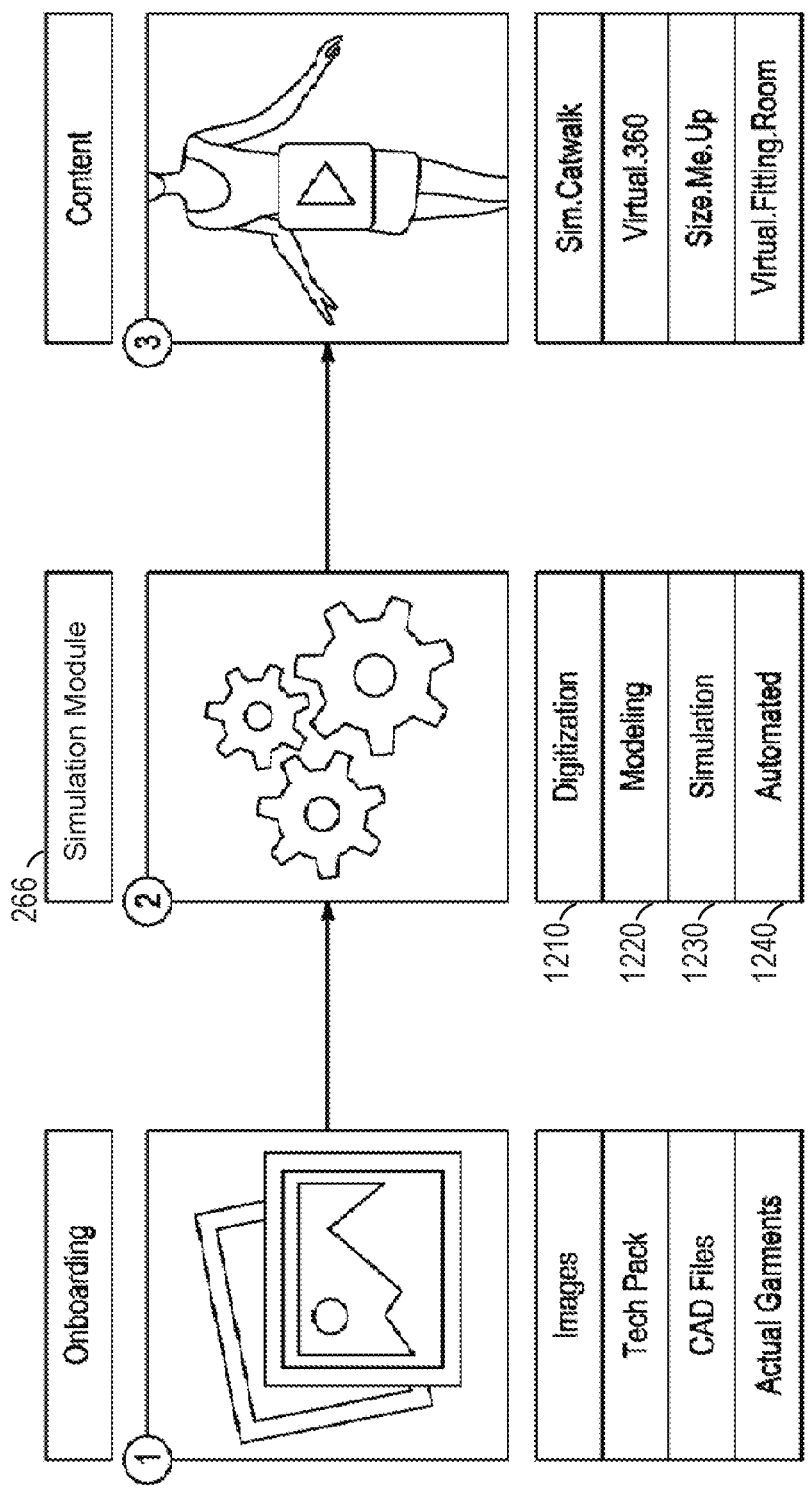
FIG. 12 is a block diagram illustrating an example digital content media simulation, in accordance with certain example embodiments.

As illustrated in FIG. 12, the simulation module 266 can take as input tessellation and material properties and can output 3-D models of clothing on one or more generated avatars. The simulation module 266 can use digitization 1210, modeling 1220, simulation 1230, and automated 1240 techniques to generate a 3-D simulation. The simulation module 266 can move points around to fit an avatar based on a simulated force (e.g., friction, stitching force). Additionally, based on this modeling, the points are connected via springs and can be stretched based on a simulated force (e.g., gravity, material property of garment). The simulation module 266 can solve a system of equations, given that the equations are all inter-connected. In one example, the system of equations can be based on the spring force on each vertex.

Figure 13:
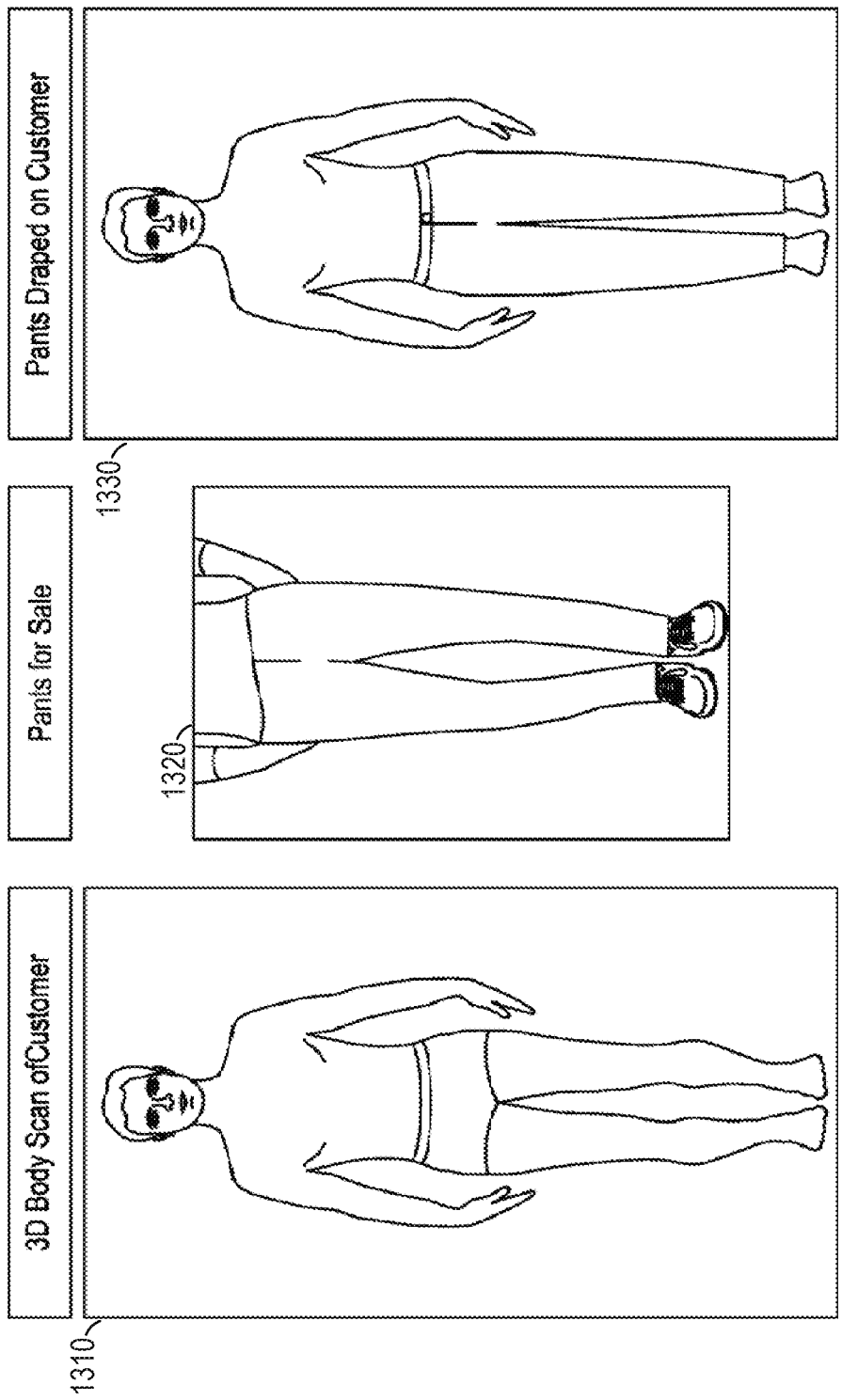
FIG. 13 illustrates an online purchase of a garment, in accordance with example embodiments.

According to various example embodiments, one or more of the methodologies described herein may facilitate the online purchase of garments. Additionally, embodiments can support the in-store purchase of garments using digital techniques to convey the same information without necessarily being online. As illustrated in FIG. 13, some example embodiments described herein can generate an avatar (e.g., 3-D body model) of a customer 1310 based on method 400. Additionally, information corresponding to a 3-D garment for sale 1320 can be accessed in operation 410. Subsequently, the rendering module 248 can drape the 3-D garment for sale 1320 on the avatar of the customer 1330, based on method 400.

Figure 14:
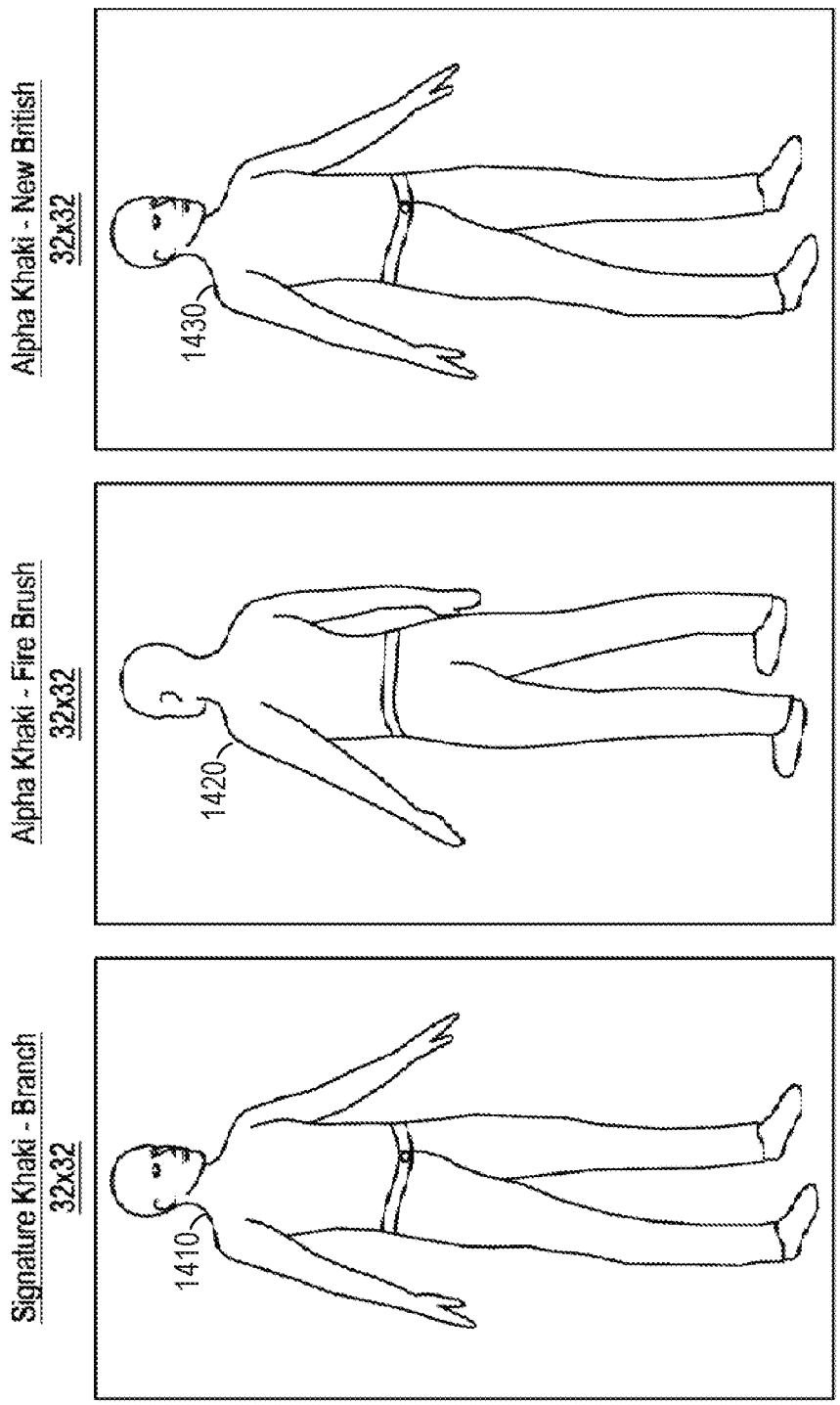
FIG. 14 illustrates another online purchase of garment, in accordance with example embodiments.

Moreover, one or more of the methodologies described herein may facilitate the visualization of different styles of a garment on an avatar using the garment simulation module 246. For example, FIG. 14 illustrates how a customer can visualize the look and feel of different pairs of khakis. In this example, the customer, using a fit map (e.g., fit map 910), can visualize that the signature khaki 1410 is a looser fit, in comparison to the alpha khaki. Additionally, the customer can visualize how the fire-brush-colored alpha khaki 1420 and the new-british-colored alpha khaki 1430 look in relation to the customer's own skin tone.

When these effects are considered in aggregate, one or more of the methodologies described herein may obviate a need for certain efforts or resources that otherwise would be involved in determining body measurements of a user from garment images. Efforts expended by a user in generating user-specific body models may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 15:
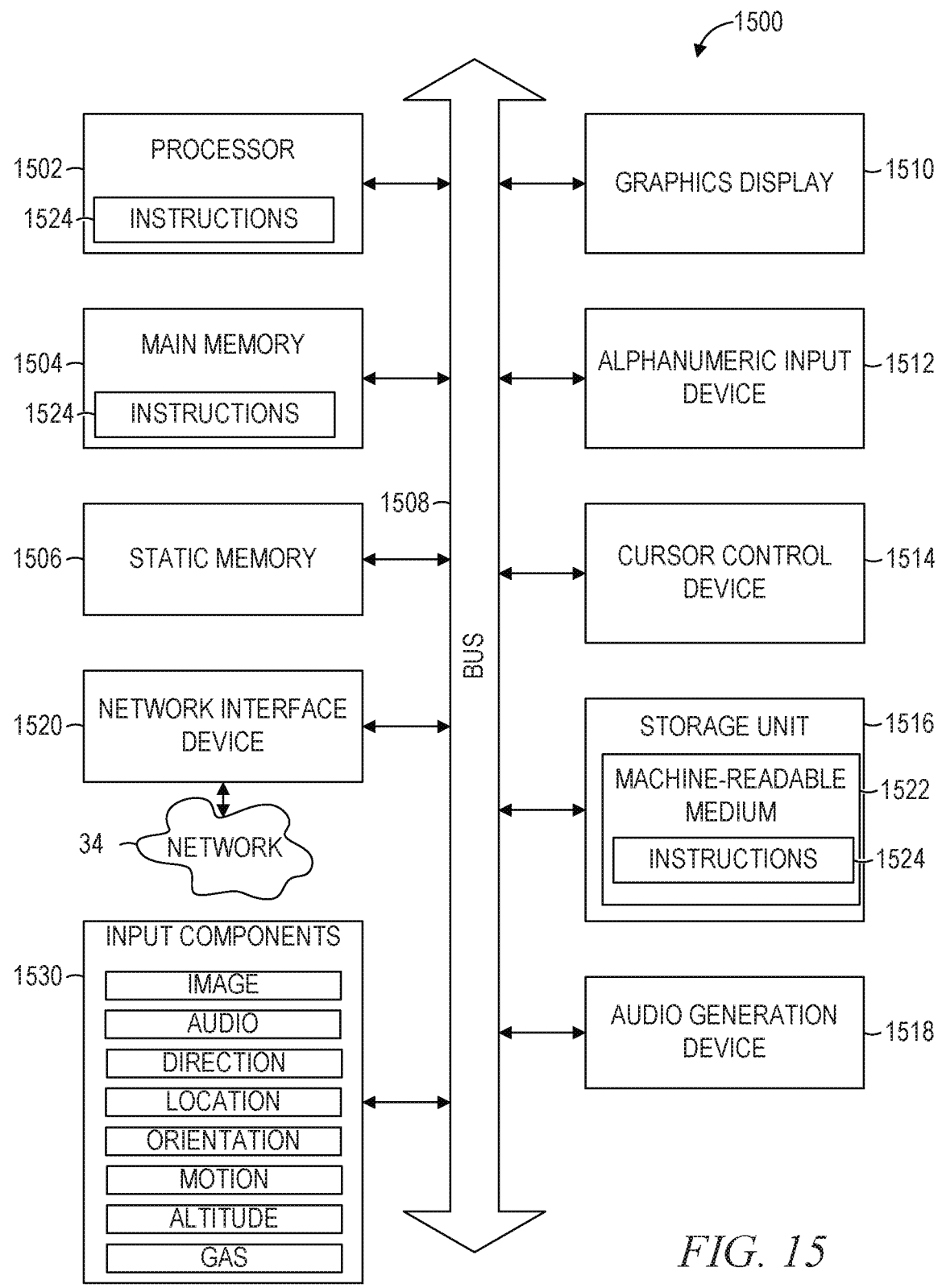
FIG. 15 is a block diagram illustrating components of a machine, according to some example embodiments, able to read instructions from a machine-readable medium and perform any one or more of the methodologies discussed herein.

FIG. 15 is a block diagram illustrating components of a machine 1500, according to some example embodiments, able to read instructions 1524 from a machine-readable medium 1522 (e.g., a non-transitory machine-readable medium, a machine-readable storage medium, a computer-readable storage medium, or any suitable combination thereof) and perform any one or more of the methodologies discussed herein, in whole or in part. Specifically, FIG. 15 shows the machine 1500 in the example form of a computer system (e.g., a computer) within which the instructions 1524 (e.g., software, a program, an application, an applet, an app, or other executable code) for causing the machine 1500 to perform any one or more of the methodologies discussed herein may be executed, in whole or in part. The server 202 can be an example of the machine 1500.

In alternative embodiments, the machine 1500 operates as a standalone device or may be connected (e.g., networked) to other machines. In a networked deployment, the machine 1500 may operate in the capacity of a server machine or a client machine in a server-client network environment, or as a peer machine in a distributed (e.g., peer-to-peer) network environment. The machine 1500 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1524, sequentially or otherwise, that specify actions to be taken by that machine. Further, while only a single machine is illustrated, the term "machine" shall also be taken to include any collection of machines that individually or jointly execute the instructions 1524 to perform all or part of any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The processor 1502 may contain microcircuits that are configurable, temporarily or permanently, by some or all of the instructions 1524 such that the processor 1502 is configurable to perform any one or more of the methodologies described herein, in whole or in part. For example, a set of one or more microcircuits of the processor 1502 may be configurable to execute one or more modules (e.g., software modules) described herein.

The machine 1500 may further include a graphics display 1510 (e.g., a plasma display panel (PDP), a light emitting diode (LED) display, a liquid crystal display (LCD), a projector, a cathode ray tube (CRT), or any other display capable of displaying graphics or video). The machine 1500 may also include an alphanumeric input device 1512 (e.g., a keyboard or keypad), a cursor control device 1514 (e.g., a mouse, a touchpad, a trackball, a joystick, a motion sensor, an eye tracking device, or other pointing instrument), a storage unit 1516, an audio generation device 1518 (e.g., a sound card, an amplifier, a speaker, a headphone jack, or any suitable combination thereof), and a network interface device 1520.

The storage unit 1516 includes the machine-readable medium 1522 (e.g., a tangible and non-transitory machine-readable storage medium) on which are stored the instructions 1524 embodying any one or more of the methodologies or functions described herein. The instructions 1524 may also reside, completely or at least partially, within the main memory 1504, within the processor 1502 (e.g., within the processor's cache memory), or both, before or during execution thereof by the machine 1500. Accordingly, the main memory 1504 and the processor 1502 may be considered machine-readable media (e.g., tangible and non-transitory machine-readable media). The instructions 1524 may be transmitted or received over the network 34 via the network interface device 1520. For example, the network interface device 1520 may communicate the instructions 1524 using any one or more transfer protocols (e.g., hypertext transfer protocol (HTTP)).

The machine-readable medium 1522 may include a magnetic or optical disk storage device, solid state storage devices such as flash memory, or other non-volatile memory device or devices. The computer-readable instructions stored on the computer-readable storage medium are in source code, assembly language code, object code, or another instruction format that is interpreted by one or more processors.

In some example embodiments, the machine 1500 may be a portable computing device, such as a smartphone or tablet computer, and have one or more additional input components 1530 (e.g., sensors or gauges). Examples of such input components 1530 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1522 is shown in an example embodiment to be a single medium, the term "machine-readable medium" should be taken to include a single medium or multiple media (e.g., a centralized or distributed database, or associated caches and servers) able to store the instructions 1524. The term "machine-readable medium" shall also be taken to include any medium, or combination of multiple media, that is capable of storing the instructions 1524 for execution by the machine 1500, such that the instructions 1524, when executed by one or more processors of the machine 1500 (e.g., the processor 1502), cause the machine 1500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   determining, by a computer system, a first set of garment dimensions corresponding to a first garment;
   determining, by the computer system, a second set of garment dimensions corresponding to a second garment;
   comparing the first set of garment dimensions to the second set of garment dimensions;
   determining a reference feature measurement associated with the second garment using a calibration factor indicating the size of the second garment;
   based on the comparison, determining a fit of the second garment in relation to the first garment, the fit comprising the reference feature measurement based on the calibration factor; and
   causing a digital representation of the determined fit in relation to the first set of garment dimensions to be displayed on a user interface of a client device, the digital representation comprising the second garment and a derivative display cue, the derivative display cue comprising a graphical overlay positioned on top of the first garment to indicate the reference feature measurement and a difference in the determined fit between the second garment in relation to the first garment.

2. The method of claim 1, wherein the representation of the determined fit represents a tightness or looseness of the second garment compared to the first garment.

3. The method of claim 1, wherein at least one of the first set of garment dimensions and the second set of garment dimensions comprises user-provided measurements.

4. The method of claim 1, further comprising:
indicating a matching size of the second garment compared to the first garment based on the determined fit.

5. The method of claim 1, wherein the first garment is associated with a first garment type and the second garment is associated with a second garment type.

6. The method of claim 1, wherein at least one of the first set of dimensions and the second set of dimensions is retrieved from previous purchase data associated with a user.

7. The method of claim 1, wherein accessing the first set of garment dimensions further comprises:
accessing a three-dimensional model descriptive of the first garment.

8. A system comprising:
a memory that stores instructions; and
one or more processors configured by the instructions to perform operations comprising:
determining, by a computer system, a first set of garment dimensions corresponding to a first garment;
determining, by the computer system, a second set of garment dimensions corresponding to a second garment;
comparing the first set of garment dimensions to the second set of garment dimensions;
determining a reference feature measurement associated with the second garment using a calibration factor indicating the size of the second garment;
based on the comparison, determining a fit of the second garment in relation to the first garment, the fit comprising the reference feature measurement based on the calibration factor; and
causing a digital representation of the determined fit in relation to the first set of garment dimensions to be displayed on a user interface of a client device, the digital representation comprising the second garment and a derivative display cue, the derivative display cue comprising a graphical overlay positioned on top of the first garment to indicate the reference feature measurement and a difference in the determined fit between the second garment in relation to the first garment.

9. The system of claim 8, wherein the representation of the determined fit represents a tightness or looseness of the second garment compared to the first garment.

10. The system of claim 8, wherein at least one of the first set of garment dimensions and the second set of garment dimensions comprise user-provided measurements.

11. The system of claim 8, wherein the operations further comprise:
indicating a matching size of the second garment compared to the first garment based on the determined fit.

12. The system of claim 8, wherein the first garment is associated with a first garment type and the second garment is associated with a second garment type.

13. The system of claim 8, wherein at least one of the first set of dimensions and the second set of dimensions is retrieved from previous purchase data associated with a user.

14. The system of claim 8, wherein accessing the first set of garment dimensions further comprises:
accessing a three-dimensional model descriptive of the first garment.

15. A non-transitory machine-readable storage medium comprising instructions that when executed by one or more processors of a machine, cause the machine to perform operations comprising:
determining, by a computer system, a first set of garment dimensions corresponding to a first garment;
determining, by the computer system, a second set of garment dimensions corresponding to a second garment;
comparing the first set of garment dimensions to the second set of garment dimensions;
determining a reference feature measurement associated with the second garment using a calibration factor indicating the size of the second garment;
based on the comparison, determining a fit of the second garment in relation to the first garment, the fit comprising the reference feature measurement based on the calibration factor; and
causing a digital representation of the determined fit in relation to the first set of garment dimensions to be displayed on a user interface of a client device, the digital representation comprising the second garment and a derivative display cue, the derivative display cue comprising a graphical overlay positioned on top of the first garment to indicate the reference feature measurement and a difference in the determined fit between the second garment in relation to the first garment.

16. The machine-readable medium of claim 15, wherein the representation of the determined fit represents a tightness or looseness of the second garment compared to the first garment.

17. The machine-readable medium of claim 15, wherein at least one of the first set of garment dimensions and the second set of garment dimensions comprise user-provided measurements.

18. The machine-readable medium of claim 15, wherein the operations further comprise:
indicating a matching size of the second garment compared to the first garment based on the determined fit.

19. The machine-readable medium of claim 15, wherein the first garment is associated with a first garment type and the second garment is associated with a second garment type.

20. The machine-readable medium of claim 15, wherein at least one of the first set of dimensions and the second set of dimensions is retrieved from previous purchase data associated with a user.

* * * * *